(12) United States Patent
Kiukkonen et al.

(10) Patent No.: US 8,818,276 B2
(45) Date of Patent: Aug. 26, 2014

(54) METHOD, APPARATUS, AND COMPUTER PROGRAM PRODUCT FOR CONTROLLING NETWORK ACCESS TO GUEST APPARATUS BASED ON PRESENCE OF HOSTING APPARATUS

(75) Inventors: Niko Kiukkonen, Veikkola (FI); Janne Marin, Espoo (FI); Jukka Reunamaki, Tampere (FI); Sverre Slotte, Espoo (FI)

(73) Assignee: Nokia Corporation, Espoo (FI)

( * ) Notice: Subject to any disclaimer, the term of this patent is extended or adjusted under 35 U.S.C. 154(b) by 212 days.

(21) Appl. No.: 13/472,638

(22) Filed: May 16, 2012

(65) Prior Publication Data

US 2013/0309971 A1 Nov. 21, 2013

(51) Int. Cl.
*H04B 7/00* (2006.01)
(52) U.S. Cl.
USPC ...... 455/41.2; 455/41.1; 455/550.1; 455/411; 455/421; 709/204; 709/223; 726/4; 726/28; 710/240
(58) Field of Classification Search
USPC .............. 455/41.2, 41.1, 421, 550.1, 557, 455/410–411; 710/240; 709/223; 726/4
See application file for complete search history.

(56) References Cited

U.S. PATENT DOCUMENTS

| | | | |
|---|---|---|---|
| 7,280,830 B2 | 10/2007 | Anderson et al. | |
| 7,634,802 B2 | 12/2009 | Chiloyan | |
| 7,917,605 B1 * | 3/2011 | McQuarrie | 709/221 |
| 8,412,149 B2 * | 4/2013 | Ray et al. | 455/404.1 |
| 8,462,734 B2 * | 6/2013 | Laine et al. | 370/331 |
| 2008/0072292 A1 * | 3/2008 | Narjala | 726/4 |
| 2008/0141293 A1 | 6/2008 | Blanchard et al. | |
| 2009/0098858 A1 | 4/2009 | Gogic | |
| 2009/0265551 A1 * | 10/2009 | Tripunitara et al. | 713/168 |
| 2010/0087164 A1 * | 4/2010 | Ritzau et al. | 455/411 |
| 2010/0283613 A1 | 11/2010 | Palin et al. | |
| 2012/0033679 A1 * | 2/2012 | Horn | 370/401 |
| 2012/0099566 A1 | 4/2012 | Laine et al. | |

FOREIGN PATENT DOCUMENTS

| | | |
|---|---|---|
| WO | WO 2007088638 | 8/2007 |
| WO | WO 2010038114 | 4/2010 |

OTHER PUBLICATIONS

Extended European Search Report for Application No. EP 13164831 dated Sep. 9, 2013.

* cited by examiner

*Primary Examiner* — Marceau Milord
(74) *Attorney, Agent, or Firm* — Locke Lord LLP

(57) ABSTRACT

Example method, apparatus, and computer program product embodiments are disclosed to enable granting access rights to guest devices. Example embodiments include a method comprising receiving, by a first device, an input from a user of the first device to grant access rights to a wireless short-range communication network to a user of a second device when the first device is present within coverage of the wireless short-range communication network; and transmitting, by the first device, an access grant message to a control node managing the wireless short-range communication network, wherein the access grant message comprises one or more rules indicating that access rights for a second device are to be granted only when the first device is present within coverage of the wireless short-range communication network.

20 Claims, 23 Drawing Sheets

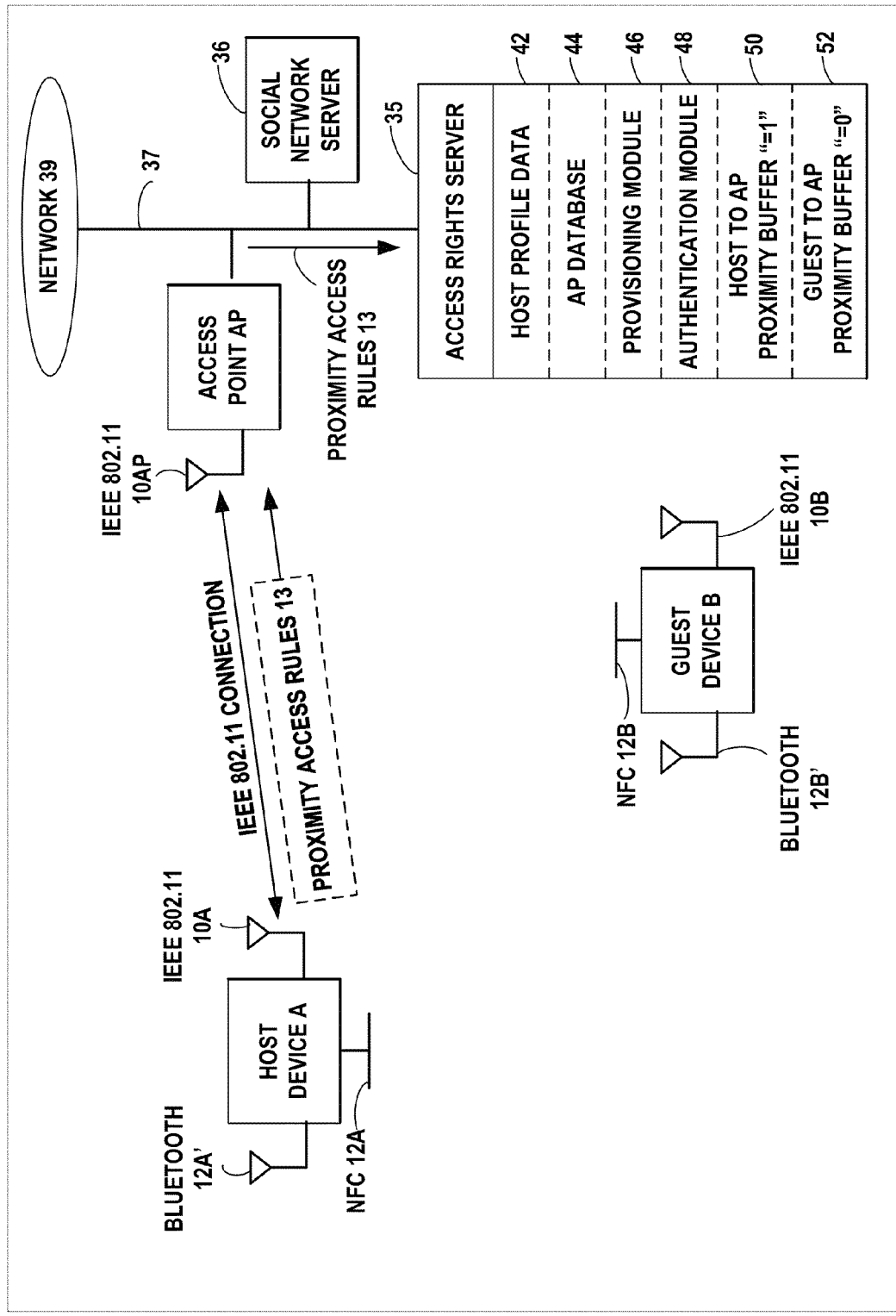
FIG. 1B1

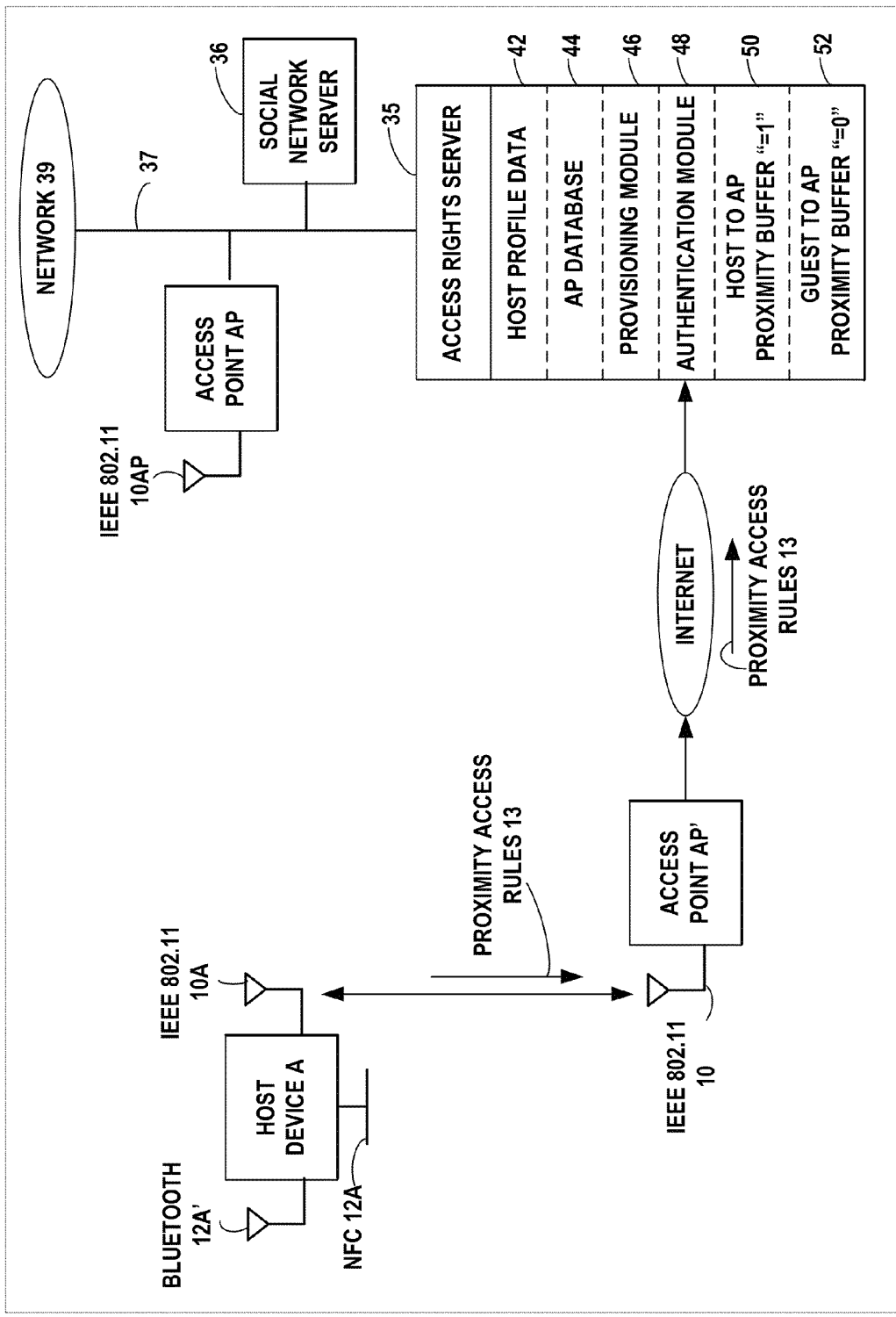
FIG. 1B2

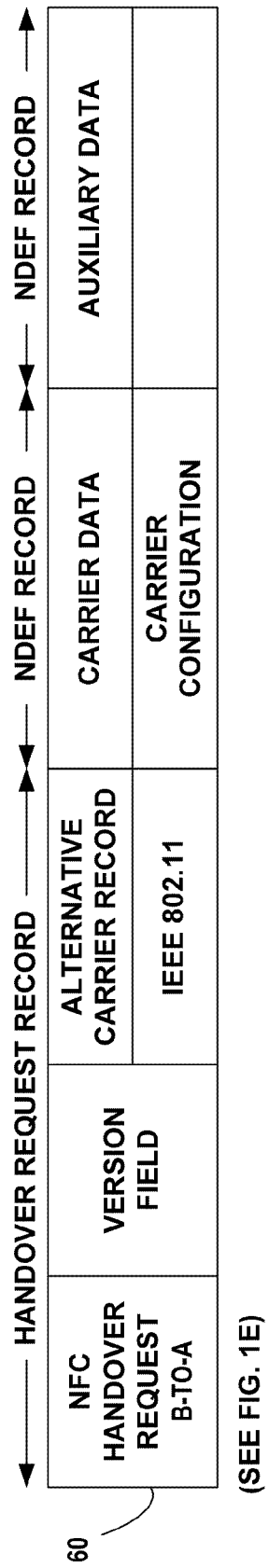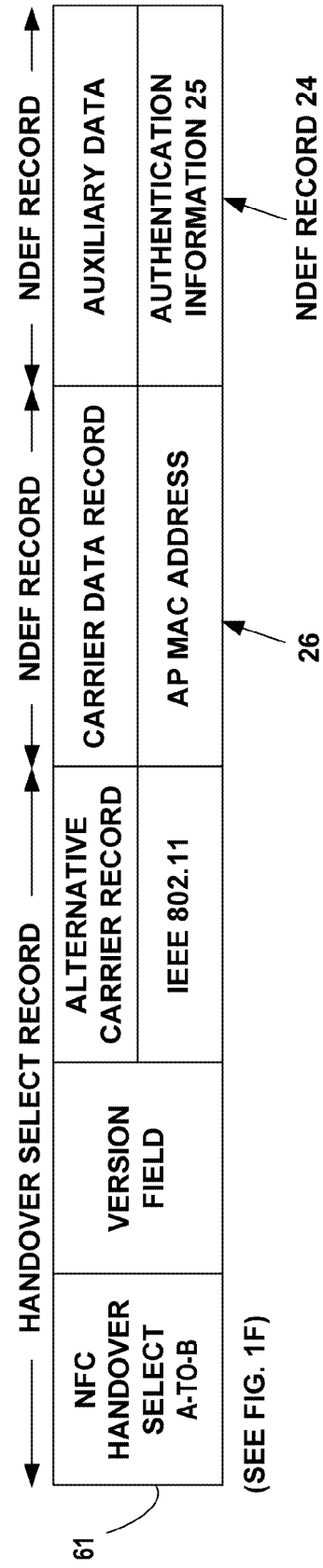

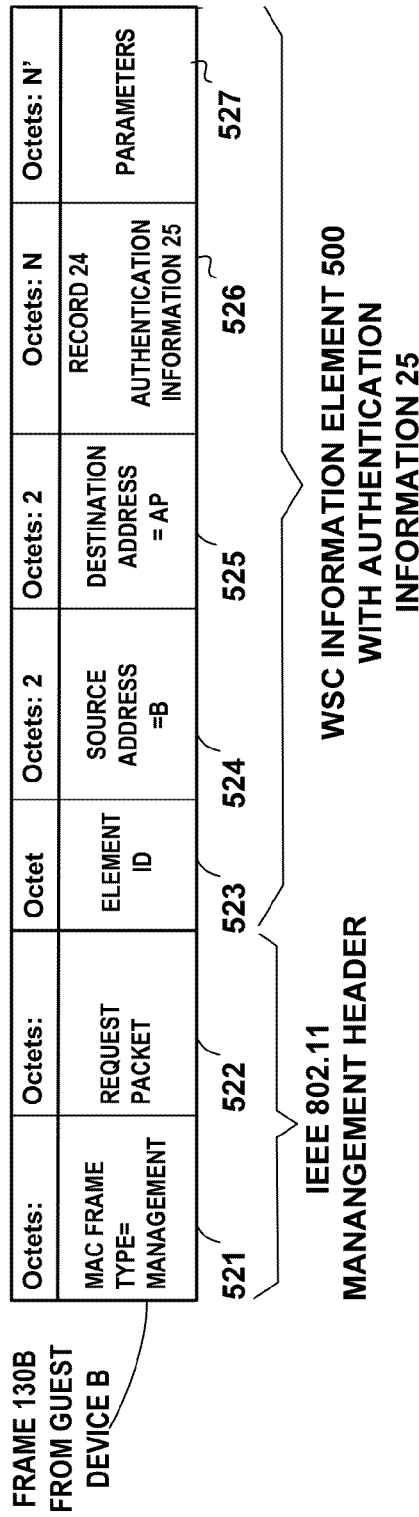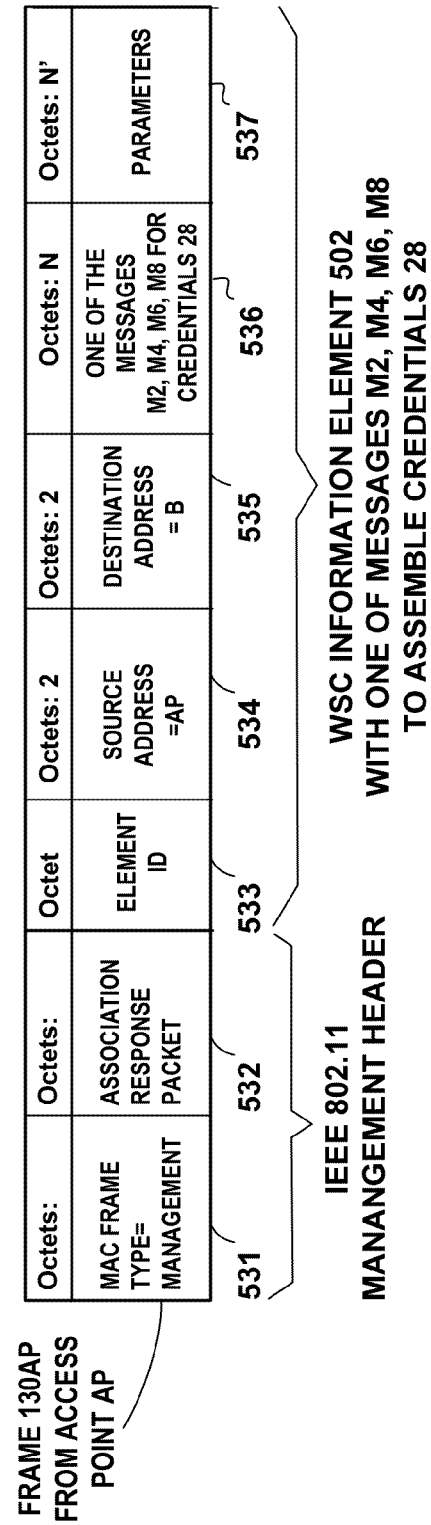

FIG. 6A

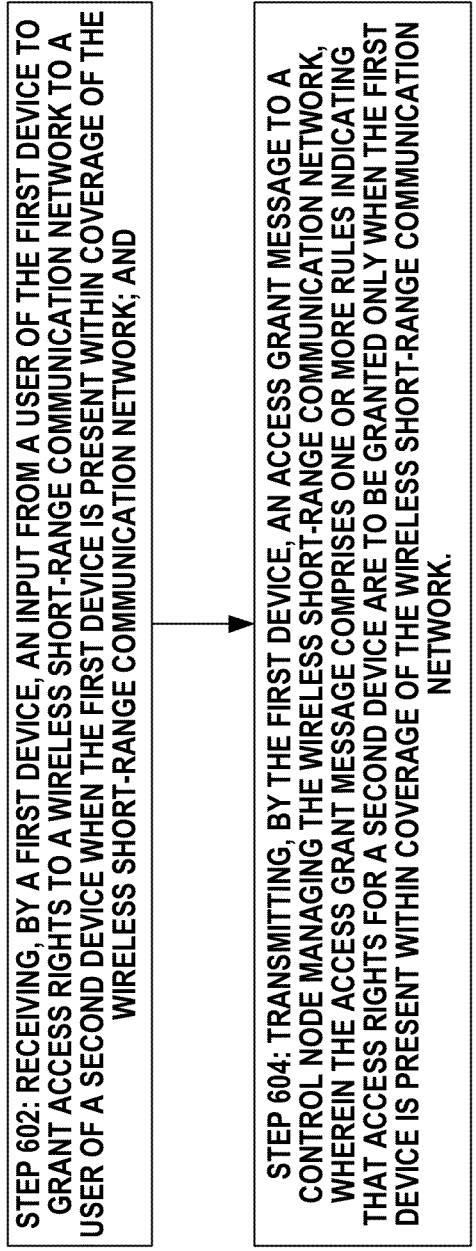

600

STEP 602: RECEIVING, BY A FIRST DEVICE, AN INPUT FROM A USER OF THE FIRST DEVICE TO GRANT ACCESS RIGHTS TO A WIRELESS SHORT-RANGE COMMUNICATION NETWORK TO A USER OF A SECOND DEVICE WHEN THE FIRST DEVICE IS PRESENT WITHIN COVERAGE OF THE WIRELESS SHORT-RANGE COMMUNICATION NETWORK; AND

STEP 604: TRANSMITTING, BY THE FIRST DEVICE, AN ACCESS GRANT MESSAGE TO A CONTROL NODE MANAGING THE WIRELESS SHORT-RANGE COMMUNICATION NETWORK, WHEREIN THE ACCESS GRANT MESSAGE COMPRISES ONE OR MORE RULES INDICATING THAT ACCESS RIGHTS FOR A SECOND DEVICE ARE TO BE GRANTED ONLY WHEN THE FIRST DEVICE IS PRESENT WITHIN COVERAGE OF THE WIRELESS SHORT-RANGE COMMUNICATION NETWORK.

METHOD, APPARATUS, AND COMPUTER PROGRAM PRODUCT FOR CONTROLLING NETWORK ACCESS TO GUEST APPARATUS BASED ON PRESENCE OF HOSTING APPARATUS

FIELD

The field of the invention relates to wireless communication, and more particularly to controlling of wireless network access based on presence of a hosting apparatus.

BACKGROUND

Modern society has adopted, and is becoming reliant upon, wireless communication devices for various purposes, such as connecting users of the wireless communication devices with other users. Wireless communication devices can vary from battery powered handheld devices to stationary household and/or commercial devices utilizing an electrical network as a power source. Due to rapid development of the wireless communication devices, a number of areas capable of enabling entirely new types of communication applications have emerged.

Cellular networks facilitate communication over large geographic areas. These network technologies have commonly been divided by generations, starting in the late 1970s to early 1980s with first generation (1G) analog cellular telephones that provided baseline voice communications, to modern digital cellular telephones. GSM is an example of a widely employed 2G digital cellular network communicating in the 900 MHZ/1.8 GHZ bands in Europe and at 850 MHz and 1.9 GHZ in the United States. While long-range communication networks, like GSM, are a well-accepted means for transmitting and receiving data, due to cost, traffic and legislative concerns, these networks may not be appropriate for all data applications.

Short-range communication technologies provide communication solutions that avoid some of the problems seen in large cellular networks. Bluetooth™ is an example of a short-range wireless technology quickly gaining acceptance in the marketplace. In addition to Bluetooth™ other popular short-range communication technologies include Bluetooth™ Low Energy, IEEE 802.11 wireless local area network (WLAN), Wireless USB (WUSB), Ultra Wide-band (UWB), ZigBee (IEEE 802.15.4, IEEE 802.15.4a), and ultra high frequency radio frequency identification (UHF RFID) technologies. All of these wireless communication technologies have features and advantages that make them appropriate for various applications.

Near field communication technologies, such as radio frequency identification (RFID) technologies, comprise a range of RF transmission systems, for example standardized and proprietary systems for a large number of different purposes, such as product tagging for inventory handling and logistics, theft prevention purposes at the point of sale, and product recycling at the end of the life-cycle of the tagged product. In addition to RFID technologies, Near Field Communication (NFC) technology has recently evolved from a combination of existing contactless identification and interconnection technologies. NFC is both a "read" and "write" technology. Communication between two NFC-compatible devices occurs when they are brought within close proximity of each other: A simple wave or touch can establish an NFC connection that may be used to exchange specific information for another communications protocol, which may then be used to create an actual connection in the other communications protocol, such as Bluetooth™ or wireless local area network (WLAN).

SUMMARY

Method, apparatus, and computer program product embodiments are disclosed to enable granting access rights to a guest device.

Example embodiments of the invention include a method comprising:

receiving, by a first device, an input from a user of the first device to grant access rights to a wireless short-range communication network to a user of a second device when the first device is present within coverage of the wireless short-range communication network; and transmitting, by the first device, an access grant message to a control node managing the wireless short-range communication network, wherein the access grant message comprises one or more rules indicating that access rights for a second device are to be granted only when the first device is present within coverage of the wireless short-range communication network.

Example embodiments of the invention include a method comprising:

transmitting, by the first device, authentication information to the control node to enable the granting of the access rights to the second device only if the first device and the second device are present within the coverage of the wireless short-range communication network.

Example embodiments of the invention include a method comprising:

wherein users of the first and second devices are socially linked.

Example embodiments of the invention include a method comprising:

wherein a user of the first device at least one of owns, hosts, manages, or administers the wireless short-range communication network.

Example embodiments of the invention include a method comprising:

further comprising:

transmitting, by the first device, the authentication information and in-band communication connection parameters, to the second device via a wireless out-of-band short-range carrier, to enable the second device to setup an in-band communication connection with the control node, according to the in-band communication connection parameters.

Example embodiments of the invention include a method comprising:

receiving, by the first device, a request from the second device for the access rights;

transmitting, by the first device, authentication information to the control node, the authentication information, to enable the granting of the access rights to the second device only if the first device and the second device are present within the coverage of the wireless short-range communication network.

Example embodiments of the invention include a method comprising:

wherein the first device is a member of a device group and access is granted to the second device whenever any devices of the group and the second device are present within the coverage of the wireless short-range communication network.

Example embodiments of the invention include an apparatus comprising:

at least one processor;

at least one memory including computer program code;

the at least one memory and the computer program code configured to, with the at least one processor, cause the apparatus at least to:

receive an input from a user of the apparatus to grant access rights to a wireless short-range communication network to a user of a second device when the apparatus is present within coverage of the wireless short-range communication network; and transmit an access grant message to a control node managing the wireless short-range communication network, wherein the access grant message comprises one or more rules indicating that access rights for a second device are to be granted only when the apparatus is present within coverage of the wireless short-range communication network.

Example embodiments of the invention include an apparatus comprising:

the at least one memory and the computer program code configured to, with the at least one processor, cause the apparatus at least to:

transmit the authentication information and in-band communication connection parameters, to the second device via a wireless out-of-band short-range carrier, to enable the second device to setup an in-band communication connection with the control node, according to the in-band communication connection parameters.

Example embodiments of the invention include an apparatus comprising:

the at least one memory and the computer program code configured to, with the at least one processor, cause the apparatus at least to:

receive a request from the second device for the access rights; and transmit authentication information to the control node, the authentication information, to enable the granting of the access rights to the second device only if the first device and the second device are present within the coverage of the wireless short-range communication network.

Example embodiments of the invention include a computer program product comprising computer executable program code recorded on a computer readable non-transitory storage medium, the computer executable program code comprising:

code for receiving, by a first device, an input from a user of the first device to grant access rights to a wireless short-range communication network to a user of a second device when the first device is present within coverage of the wireless short-range communication network; and code for transmitting, by the first device, an access grant message to a control node managing the wireless short-range communication network, wherein the access grant message comprises one or more rules indicating that access rights for a second device are to be granted only when the first device is present within coverage of the wireless short-range communication network.

Example embodiments of the invention include a method comprising:

transmitting, by a guest device to a control node of a wireless short-range communication network, authentication information for joining the wireless short-range communication network;

wherein the wireless short-range communication network is at least one of owned, hosted, managed, or administered by a user of a first device; and receiving, by the guest device, access rights to the wireless short-range communication network from the control node, subject to one or more rules indicating that the access rights are to be granted to the guest device only while the guest device and the first device are within coverage of the wireless short-range communication network.

Example embodiments of the invention include a method comprising:

receiving, by the guest device, a continuation of the access rights to the network from the control node, while the guest device and the first device continue to be within coverage of the wireless short-range communication network.

Example embodiments of the invention include a method comprising:

receiving, by the guest device, a revocation of the access rights to the network from the control node, when the guest device or the first device is no longer within coverage of the wireless short-range communication network.

Example embodiments of the invention include a method comprising:

receiving, by the guest device, the authentication information and in-band communication connection parameters, from the first device via a wireless out-of-band short-range carrier, to enable the guest device to setup an in-band communication connection with the control node, according to the in-band communication connection parameters.

Example embodiments of the invention include an apparatus comprising:

at least one processor;

at least one memory including computer program code;

the at least one memory and the computer program code configured to, with the at least one processor, cause the apparatus at least to:

transmit to a control node of a wireless short-range communication network, authentication information for joining the wireless short-range communication network;

wherein the wireless short-range communication network is at least one of owned, hosted, managed, or administered by a user of a first device; and receive access rights to the wireless short-range communication network from the control node, subject to one or more rules indicating that the access rights are to be granted to the apparatus only while the apparatus and the first device are within coverage of the wireless short-range communication network.

Example embodiments of the invention include an apparatus comprising:

the at least one memory and the computer program code configured to, with the at least one processor, cause the apparatus at least to:

receive a continuation of the access rights to the network from the control node, while the apparatus and the first device continue to be within coverage of the wireless short-range communication network.

Example embodiments of the invention include an apparatus comprising:

the at least one memory and the computer program code configured to, with the at least one processor, cause the apparatus at least to:

receive a revocation of the access rights to the network from the control node, when the apparatus or the first device is no longer within coverage of the wireless short-range communication network.

Example embodiments of the invention include an apparatus comprising:

the at least one memory and the computer program code configured to, with the at least one processor, cause the apparatus at least to:

receive the authentication information and in-band communication connection parameters, from the first device via a wireless out-of-band short-range carrier, to enable the apparatus to setup an in-band communication connection with the control node, according to the in-band communication connection parameters.

Example embodiments of the invention include a computer program product comprising computer executable program code recorded on a computer readable non-transitory storage medium, the computer executable program code comprising:

code for transmitting, by a guest device to a control node of a wireless short-range communication network, authentication information for joining the wireless short-range communication network;

wherein the wireless short-range communication network is at least one of owned, hosted, managed, or administered by a user of a first device; and code for receiving, by the guest device, access rights to the wireless short-range communication network from the control node, subject to one or more rules indicating that the access rights are to be granted to the guest device only while the guest device and the first device are within coverage of the wireless short-range communication network.

Example embodiments of the invention include a method comprising:

receiving, at a control node managing a wireless short-range communication network, an access grant message from a first device comprising one or more rules indicating that access rights for a second device are to be granted only when the first device is present within the coverage of the wireless short-range communication network; and determining, at the control node managing the wireless short-range communication network, whether the first device is present within the coverage of the wireless short-range communication network when receiving an access request from the second device.

Example embodiments of the invention include a method comprising:

granting, by the control node, the access rights to the second device to access the wireless short-range communication network only when it is determined that both the first device and the second device are within coverage of the wireless short-range communication network.

Example embodiments of the invention include a method comprising:

continuing, by the control node, the access rights to the network, while the first device and the second device continue to be within coverage of the wireless short-range communication network.

Example embodiments of the invention include a method comprising:

revoking, by the control node, the access rights to the network, when the first device or the second device is no longer within coverage of the wireless short-range communication network.

Example embodiments of the invention include a method comprising:

wherein the first device is a member of a device group and access is granted to the second device whenever any devices of the group and the second device are present within the coverage of the wireless short-range communication network.

Example embodiments of the invention include an apparatus comprising:

at least one processor;

at least one memory including computer program code;

the at least one memory and the computer program code configured to, with the at least one processor, cause the apparatus at least to:

receive, at the apparatus managing a wireless short-range communication network, an access grant message from a first device comprising one or more rules indicating that access rights for a second device are to be granted only when the first device is present within the coverage of the wireless short-range communication network; and determine whether the first device is present within the coverage of the wireless short-range communication network when receiving an access request from the second device.

Example embodiments of the invention include an apparatus comprising:

wherein the at least one memory and the computer program code are further configured to, with the at least one processor, cause the apparatus to grant the access rights to the second device to access the wireless short-range communication network only when it is determined that both the first device and the second device are within coverage of the wireless short-range communication network.

Example embodiments of the invention include a computer program product comprising computer executable program code recorded on a computer readable non-transitory storage medium, the computer executable program code comprising:

code for receiving, at a control node managing a wireless short-range communication network, an access grant message from a first device comprising one or more rules indicating that access rights for a second device are to be granted only when the first device is present within the coverage of the wireless short-range communication network; and code for determining, at the control node managing the wireless short-range communication network, whether the first device is present within the coverage of the wireless short-range communication network when receiving an access request from the second device.

The resulting embodiments enable granting access rights to guest devices.

DESCRIPTION OF THE FIGURES

FIG. 1B1 illustrates the example network diagram of FIG. 1A, wherein host device A is shown as having joined a WLAN network by having formed an IEEE 802.11 in-band short-range carrier communication connection with the access point AP, the access point AP managing an infrastructure network, the host device A transmitting proximity access rules to the access point and the access point AP uploading the proximity access rules to the access rights server, in accordance with example embodiments of the invention.

FIG. 1B2 illustrates the example network diagram of FIG. 1A, wherein host device A is shown transmitting the proximity access rules to the access rights server on a different path than through the access point AP, as was shown in FIG. 1B1, in accordance with example embodiments of the invention.

FIG. 3A is an example embodiment of one example of an NFC handover request message from the guest device B to the host device A with a request for information to enable guest device B to obtain network access through the access point AP, in accordance with example embodiments of the invention.

FIG. 3B is an example embodiment of one example an NFC handover select message sent from host device A to guest device B to provide connectivity settings and the authentication information recognizable by the access point AP, to obtain network access through the access point AP, according to an embodiment of the present invention.

FIG. 5A illustrates one example IEEE 802.11 request frame, for example a probe request frame sent by guest device B to the access point AP with the authentication information in a WSC information element, according to an embodiment of the present invention.

FIG. 5B illustrates one example MAC management frame sent by the access point AP to the guest device B with one of the messages M2, M4, M6, and M8 in a WSC information element, used to assemble the network credentials in guest device B, according to an embodiment of the present invention.

FIG. 6A is an example flow diagram of operational steps of an example embodiment of the method carried out by host device A of FIG. 2A, according to an embodiment of the present invention.

DISCUSSION OF EXAMPLE EMBODIMENTS OF THE INVENTION

Figure 1A:
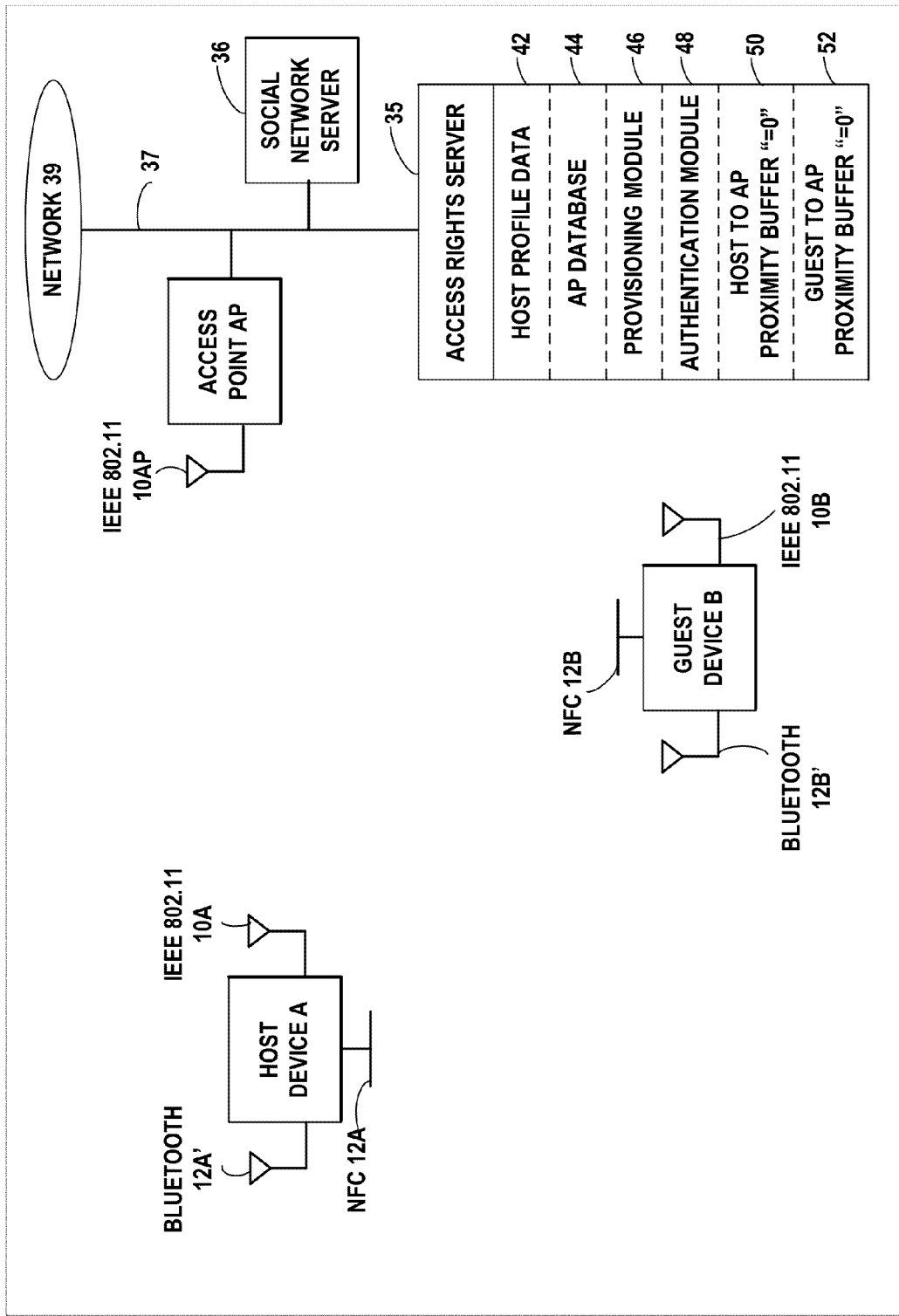
FIG. 1A illustrates an example network diagram before the nodes are connected, wherein host device A, guest device B, and the access point AP include an in-band short-range carrier transceiver, such as an IEEE 802.11 WLAN transceiver. The host device A and guest device B further include an out-of-band short-range carrier transceiver, such as a Near Field Communication (NFC) transceiver or a Bluetooth transceiver, in accordance with example embodiments of the invention.

This section is organized into the following topics:
A. Wireless Short-Range Communication Networks
B. Connection Formation Between Bluetooth™ Devices
C. WLAN Communication Technology
1, IEEE 802.11 WLAN
2. Wi-Fi Protected Setup/Wi-Fi Simple Configuration (WSC)
3. Authentication in Wi-Fi Protected Setup/Wi-Fi Simple Configuration
4. Wi-Fi Direct—Software Access Points
D. Near-Field Communication (NFC) Technology
E. NFC Connection Handover to WLAN
F. Controlling Network Access to Guest Apparatus Based On Presence of Host

A. Wireless Short-Range Communication Networks

Short-range communication technologies provide communication solutions appropriate for many data applications, without the cost, traffic and legislative concerns of longer-range communication technologies. Popular short-range communication technologies include Bluetooth basic rate/enhanced data rate (BR/EDR), Bluetooth Low Energy (LE), IEEE 802.11 wireless local area network (WLAN), Wireless Universal Serial Bus (WUSB), Ultra Wide-band (UWB), Zig-Bee (IEEE 802.15.4, IEEE 802.15.4a), and near field communication technologies, such as radio frequency identification (RFID) and near field communication (NFC) technology that enable contactless identification and interconnection of wireless devices.

B. Connection Formation Between Bluetooth™ Devices

A procedure for forming connections between Bluetooth™ devices is described in the Bluetooth™ Specification, Version 4, Jun. 30, 2010. The Bluetooth™ Baseband is the part of the Bluetooth™ system that implements the Media Access Control (MAC) and physical layer procedures to support the connection formation, exchange of data information streams, and ad hoc networking between Bluetooth™ devices. Connection formation includes inquiry, inquiry scanning, inquiry response, paging, page scanning, and page response procedures.

1, Inquiry

Inquiry is a procedure where a Bluetooth™ device transmits inquiry messages and listens for responses in order to discover the other Bluetooth™ devices that are within the coverage area. Bluetooth™ devices use the inquiry procedure to discover nearby devices, or to be discovered by devices in their locality. A Bluetooth™ device that tries to find other nearby devices is known as an inquiring host device And actively sends inquiry requests. Bluetooth™ devices that are available to be found are known as discoverable devices, listen or scan for these inquiry requests, and send responses. The inquiry procedure uses dedicated physical channels for the inquiry requests and responses. The inquiry procedure does not make use of any of the architectural layers above the physical channel, although a transient physical link may be considered to be present during the exchange of inquiry and inquiry response information.

Bluetooth™ devices communicate with one another over a total bandwidth of 80 MHz divided into 79 physical channels of 1 MHz each. An inquiring device wanting to discover other devices repetitively probes a first set of 16 frequencies, probing two frequencies every 625 microseconds. It repeats this at least 256 times. Then, it repetitively probes a second set of 16 frequencies. The inquiring device will repeat entire cycle at least two times. Of the 79 radio carriers, 32 are considered wake-up carriers and the inquiring guest device Broadcasts inquiry packets on these 32 carrier frequencies.

During the inquiry procedure, the master transmits inquiry messages with the general or dedicated inquiry access code. The timing for inquiry is the same as for paging. The identity or ID packet consists of the inquiry access code (IAC). It has a fixed length of 68 bits. The receiver uses a bit correlator to match the received packet to the known bit sequence of the ID packet. In order to discover other devices a device may enter inquiry substate. In this substate, it may repeatedly transmit the inquiry message (ID packet) at different hop frequencies. The inquiry hop sequence is derived from the Lower Address Part (LAP) of the General Inquiry Access Code (GIAC). Thus, even when dedicated inquiry access codes (DIACs) are used, the applied hopping sequence is generated from the GIAC LAP. A device that allows itself to be discovered, may regularly enter the inquiry scan substate to respond to inquiry messages. The inquiry response is optional: a device is not forced to respond to an inquiry message. During the inquiry substate, the discovering device collects the Bluetooth™ host device Addresses and clocks of all devices that respond to the inquiry message. In addition, the discovering host device Also collects extended information (e.g. local name and supported services) from devices that respond with an extended inquiry response packet. It may then, if desired, make a connection to any one of the discovered devices by means of the page procedure described below. The inquiry message broadcast by the source does not contain any information about the source. However, it may indicate which class of devices should respond. There is one general inquiry access code (GIAC) to inquire for any device, and a number of dedicated inquiry access codes (DIAC) that only inquire for a certain type of device. The inquiry access codes are derived from reserved Bluetooth™ host device Addresses. There is only one DIAC defined in the Bluetooth™ Specification, and it is called the Limited Inquiry Access Code (LIAC). The LIAC is only intended to be used for limited time periods in scenarios where both devices have been explicitly caused to enter this state, usually by user action.

Inquiry scan is a procedure where a Bluetooth™ device listens for inquiry messages received on its inquiry scan physical channel. A device using one of its inquiry scan channels remains passive on that channel until it receives an inquiry message on this channel from another Bluetooth™ device. This is identified by the appropriate inquiry access code. The inquiry scanning device will then follow the inquiry response procedure to return a response to the inquiring device. The inquiry scan substate is very similar to the page scan substate. However, instead of scanning for the device's host device Access code, the receiver may scan for the inquiry access code long enough to completely scan for 16 inquiry frequencies. The inquiry procedure uses 32 dedicated inquiry hop frequencies according to the inquiry hopping sequence. These frequencies are determined by the general inquiry address. The phase is determined by the native clock of the device carrying out the inquiry scan. Instead of, or in addition to, the general inquiry access code, the device may scan for one or more dedicated inquiry access codes. However, the scanning may follow the inquiry scan hopping sequence determined by the general inquiry address. The inquiry scan interval may be less than or equal to 2.56 s.

2. Inquiry Response

An inquiry response packet (FHS) is transmitted from the slave to the master after the slave has received an inquiry message. This packet contains information necessary for the inquiring master to page the slave and follows 625 microseconds after the receipt of the inquiry message. The inquiry response packet is received by the master at the hop frequency when the inquiry message received by the slave was first in the master-to-slave slot. The slave response substate for inquiries differs completely from the slave response substate applied for pages. When the inquiry message is received in the inquiry scan substate, the recipient may return an inquiry response (FHS) packet containing the recipient's host device Address (BD_ADDR) and other parameters. If the recipient has non-zero extended inquiry response data to send, it may return an extended inquiry response packet after the FHS packet. On the first inquiry message received in the inquiry scan substate the slave may enter the inquiry response substate. If the slave has non-zero extended inquiry response data to send it may return an FHS packet, with the extended inquiry response bit set to one, to the master 625 microseconds after the inquiry message was received. It may then return an extended inquiry response packet 1250 microseconds after the start of the FHS packet. If the slave's extended inquiry response data is all zeroes the slave may only return an FHS packet with the extended inquiry response bit set to zero.

A contention problem could arise when several devices are in close proximity to the inquiring device or master and all respond to an inquiry message at the same time. However, because every device has a free running clock it is highly unlikely that they all use the same phase of the inquiry hopping sequence. In order to avoid repeated collisions between devices that wake up in the same inquiry hop channel simultaneously, a device will back-off for a random period of time. Thus, if the device receives an inquiry message and returns an FHS packet, it will generate a random number, RAND, between 0 and MAX_RAND. For scanning intervals greater than or equal to 1.28 seconds MAX_RAND will be 1023, however, for scanning intervals less than 1.28s MAX_RAND may be as small as 127. A profile that uses a DIAC may choose to use a smaller MAX_RAND than 1023 even when the scanning interval is greater than or equal to 1.28s. The slave will return to the CONNECTION or STANDBY state for the duration of at least RAND time slots. Before returning to the CONNECTION and STANDBY state, the device may go through the page scan substate. After at least RAND slots, the device will add an offset of 1 to the phase in the inquiry hop sequence (the phase has a 1.28 second resolution) and return to the inquiry scan substate again. If the slave is triggered again, it will repeat the procedure using a new RAND. The offset to the clock accumulates each time an FHS packet is returned. During a period when the inquiry device is broadcasting inquiry packets, a slave may respond multiple times, but on different frequencies and at different times. Reserved synchronous slots should have priority over response packets; that is, if a response packet overlaps with a reserved synchronous slot, it will not be sent, but the next inquiry message is awaited. If a device has extended inquiry response data to send, but the extended inquiry response packet overlaps with a reserved synchronous slot, the FHS packet may be sent with the EIR bit set to zero.

The messaging during the inquiry routines is summarized as follows:

In step 1, the master transmits an inquiry message using the inquiry access code and its own clock.

In step 2, the slave responds with the FHS packet containing the slave's Bluetooth™ host device Address, native clock and other slave information. This FHS packet is returned at times that tend to be random. The FHS packet is not acknowledged in the inquiry routine, but it is retransmitted at other times and frequencies as long as the master is probing with inquiry messages.

In step 3, if the slave has non-zero extended inquiry response data, it sends an extended inquiry response packet to the master.

3. Extended Inquiry Response

An Extended Inquiry Response may be used to provide miscellaneous information during the inquiry response procedure. Data types are defined for such things as local name and supported services, information that otherwise would have to be obtained by establishing a connection. A device that receives a local name and a list of supported services in an extended inquiry response does not have to connect to do a remote name request and a service discovery protocol (SDP) service search, thereby shortening the time to useful information. If the slave transmits an extended inquiry response packet, it is transmitted 1250 microseconds after the start of the inquiry response packet. The extended inquiry response packet is received by the master at the hop frequency when the inquiry message received by the slave was first in the master-to-slave slot. The extended inquiry response packet is an Asynchronous Connection-oriented Logical transport (ACL) data medium rate (DM) packet with type DM1, DM3, DM5, DH1, DH3 or DH5. To minimize interference it is recommended to use the shortest packet that is capable of containing the data. The packet is sent on the same frequency as the (frequency hop synchronization) FHS packet, 1250 microseconds after the start of the FHS packet. In the packet header, the logical transport address (LT_ADDR) may be set to zero. TYPE may be one of DM1, DM3, DM5, DH1, DH3 or DH5. FLOW, ARQN and SEQN may all be set to zero and ignored during receipt. (ARQN is automatic repeat address acknowledgement indication and SEQN is sequential numbering scheme.) The header error check (HEC) linear feedback shift register (LFSR) may be initialized with the same default check initialization (DCI) as for the FHS packet. In the payload header, logical link identifier (LLID) may contain the value 10 (start of a logical link control and adaptation control (L2CAP) message or no fragmentation). FLOW may be set to zero and ignored upon receipt. The length of the payload body (LENGTH) may be smaller than or equal to 240 bytes. The cyclic redundancy check (CRC) linear feedback shift register (LFSR) may be initialized with the same DCI as for the FHS packet. The data whitening LFSR may be initialized with the same value as for the FHS packet. The length of the payload body (LENGTH) may be smaller than or equal to 240 bytes. The CRC LFSR may be initialized with the same DCI as for the FHS packet. The data whitening LFSR may be initialized with the same value as for the FHS packet. The payload data has two parts, a significant part followed by a non-significant part. The significant part contains a sequence of data structures. The non-significant part contains all zero octets. The baseband may not change any octets in the significant part. When transmitting data, the non-significant part octets may be omitted from the payload. A device may store a single extended inquiry response packet. This packet may be used with all inquiry access codes (IACs).

4. Page

Page is the initial phase of the connection procedure where a device transmits a train of page messages until a response is received from the target device or a timeout occurs. Page scan is a procedure where a device listens for page messages received on its page scan physical channel. In forming a connection, the paging device will become the master and the page scan device will become the slave in a piconet. Initially, after the slave has received an inquiry message, an inquiry response packet is transmitted from the slave to the master. The inquiry response packet sent from the slave contains information necessary for the inquiring master to page the slave, such as Bluetooth™ host device Address and the clock of the slave device. In the paging procedure, the Bluetooth™ device that will become the master carries out a page procedure by transmitting page messages in connection request packets to the specified Bluetooth™ slave device that carries out a page scanning procedure to listen for connection request packets from the paging device. A connectable Bluetooth™ device listens for a page request on its page scan channel and, once received, enters into a sequence of exchanges with the paging device. In order for a device to connect to another device, it performs frequency hopping all page scan channel frequencies, sending a page request on each frequency and listening for a response. The page scan channel uses an access code derived from the scanning device's Bluetooth™ host device Address BD_ADDR to identify communications on the channel. The page scan channel uses a slower hopping rate than the hop rate of the paging device, using the Bluetooth™ device clock of the scanning host device As an input. A device listening on its page scan channel remains passive until it receives a page request from another Bluetooth™ device, identified by the page scan channel access code. The two devices will then follow the page procedure to form a connection where the paging device is the master and the page scan device is the slave in a piconet. In order for a paging device to connect to another Bluetooth™ device, it uses the page scan channel of the target device in order to send page requests. If the paging device does not know the phase of the target device's page scan channel, it does not know the current hop frequency of the target device. Therefore, the paging device transmits page requests on each of the page scan hop frequencies and listens for a page response. This is done at a faster hop rate, allowing the paging device to cover all page scan frequencies in a short period of time. The paging device may have some knowledge of the target device's Bluetooth™ clock, such as indicated during a previous inquiry transaction between the two devices, and may be able to predict the phase of the target device's page scan channel. It may use this information to optimize the synchronization of the paging and page scanning process and speed up the formation of the connection.

5. Service Discovery Protocol (SDP)

Bluetooth devices are designed to find other Bluetooth devices within their ten meter radio communications range and to discover what services they offer, using a service discovery protocol (SDP). The SDP searching function relies on links being established between the requesting Bluetooth device in a client role and the responding Bluetooth device in a server role. Once a link has been established, it can be used to find out about services in the responding Bluetooth host device And how to connect to them.

Service Discovery Protocol (SDP) is used to allow devices to discover what services each other support, and what parameters to use to connect to them. For example, when connecting a mobile phone to a Bluetooth headset, SDP will be used to determine which Bluetooth profiles are supported by the headset (headset profile, hands free profile, advanced audio distribution profile, etc.) and the protocol multiplexor settings needed to connect to each of them. Each service is identified by a Universally Unique Identifier (UUID), with official services (Bluetooth profiles) assigned a short form UUID (16 bits rather than the full 128).

C. WLAN Communication Technology

1. IEEE 802.11 WLAN

The IEEE 802.11 standard specifies methods and techniques of an exemplary wireless local area network (WLAN) operation. examples include the IEEE 802.11b and 802.11g wireless local area network specifications, which have been a staple technology for traditional WLAN applications in the 2.4 GHz ISM band. The various amendments to the IEEE 802.11 standard were consolidated for IEEE 802.11a, b, d, e, g, h, i, j protocols, into the base standard IEEE 802.11-2007, *Wireless Medium Access Control (MAC) and Physical Layer (PHY) Specifications*, June 2007 (incorporated herein by reference). Since then, emerging broadband applications have stimulated interest in developing very high-speed wireless networks for short range communication, for example, the IEEE 802.11n, the planned IEEE 802.11 ac, and the planned IEEE 802.11ad WLAN specifications that are to provide a very high throughput in higher frequency bands. Applications of these IEEE 802.11 standards include products such as consumer electronics, telephones, personal computers, and access points for both for home and office.

An IEEE 802.11 WLAN may be organized as an independent basic service set (IBSS) or an infrastructure basic service set (BSS). The access point (AP) in an infrastructure basic service set (BSS) IEEE 802.11 WLAN network, is a central hub that must relay all communication between the mobile wireless devices (STAs) in an infrastructure BSS. If a STA in an infrastructure BSS wishes to communicate a frame of data to a second STA, the communication must take two hops. First, the originating STA transfers the frame to the AP. Second, the AP transfers the frame to the second STA. In an infrastructure BSS, the AP either transmits Beacons or responds to probes received from STAs. After a possible authentication of a STA that is conducted by the AP, an association occurs between the AP and a STA enabling data traffic to be exchanged with the AP. The Access Point (AP) in an Infrastructure BSS may bridge traffic out of the BSS onto a distribution network. STAs that are members of the BSS exchange packets only with the AP.

The IEEE 802.11 WLAN uses two types of transmission: Distributed Coordination Function (DCF) and Point Coordination Function (PCF). DCF employs Carrier Sense Multiple Access with Collision Avoidance (CSMA/CA). Every packet sent is positively acknowledged by the receiver. A transmission begins with a Request to Send (RTS) and the receiver responds with a Clear to Send (CTS). The channel is cleared by these two messages, since all STAs that hear the CTS will suppress their own start of a transmission. Then when data packets are transmitted, each has a Network Allocation Vector (NAV) containing a duration value to reserve the channel for the sender and receiver for an interval after the current packet, equal to the NAV duration. The value of the NAV decrements with the passage of time. Once the sender and receiver have reserved the channel, they may hold it for the remaining duration of the NAV value. The last acknowledgement packet (ACK) contains a NAV value of zero, to immediately release the channel. The Point Coordination Function (PCF) is a polling method among the STAs of the BSS, which is coordinated by the access point.

IEEE 802.11 authentication operates at the link level between IEEE 802.11 STAs. IEEE Std 802.11 attempts to control LAN access via the authentication service. IEEE 802.11 authentication is a station service that may be used by all STAs to establish their identity to STAs with which they communicate in both infrastructure and IBSS networks. If a mutually acceptable level of authentication has not been established between two STAs, then an association is not established. IEEE 802.11 defines two authentication methods: Open System authentication and Shared Key authentication. Open System authentication admits any STA to the distribution system. Shared Key authentication relies on wired equivalent privacy to demonstrate knowledge of an encryption key. The IEEE 802.11 authentication mechanism also allows definition of new authentication methods. A robust security network association (RSNA) supports authentication based on IEEE 802.1X-2004, or preshared keys (PSKs). IEEE 802.1X authentication utilizes the Extensible Authentication Protocol (EAP) (IETF RFC 3748-2004) to authenticate STAs and an authentication server (AS) with one another. In IEEE 802.1X, a STA being authenticated and the authenticator device exchange protocol information via the IEEE 802.1X Uncontrolled Port. The IEEE 802.1X Controlled Port is blocked from passing general data traffic between two STAs until an IEEE 802.1X authentication procedure completes successfully over the IEEE 802.1X Uncontrolled Port.

2. Wi-Fi Protected Setup/Wi-Fi Simple Configuration (WSC)

Network setup for IEEE 801.11 WLANs has been simplified by the Wi-Fi Protected Setup™ system that is included in most access points. The Wi-Fi Alliance published the Wi-Fi Protected Setup (WPS) specification 1.0, *Wi-Fi Protected Setup Specification*, Version 1.0h, December 2006 (incorporated herein by reference). *The Wi-Fi Simple Configuration (WSC) Specification*, Version 2.0, Dec. 20, 2010, (incorporated herein by reference), updates the *Wi-Fi Protected Setup Specification*, Version 1.0h. The acronym WSC, for Wi-Fi Simple Configuration Specification, may be used interchangeably with the acronym WPS, for Wi-Fi Protected Setup. Wi-Fi Protected Setup facilitates the initial setting up of IEEE 802.11 devices in a Wi-Fi infrastructure network so that they may be more easily configured with security features and so that that new Wi-Fi devices may be added to the network. Wi-Fi Protected Setup allows access points to be set up by entering a PIN. The Protected Setup system uses this information to send data to a computer connected to the access point, to complete the network setup. Wi-Fi Protected Setup defines new IEEE 802.11 information elements (IE) that are included in beacons, probe requests and probe responses. The purpose of these IEs is to advertise the presence of devices that are capable of performing Wi-Fi Protected Setup operations.

Initial discovery of Wi-Fi Simple Configuration devices is accomplished using IEEE 802.11 Information Elements in management frames (Beacon, Probe Request, and Probe Response). If the Enrollee decides to pursue a connection to the network, it initiates an IEEE 802.1X/EAP connection for the Extensible Authentication Protocol (EAP)-based Registration Protocol. The Wi-Fi Simple Configuration Information Element complies with the IEEE 802.11 Information Element format and indicates specific data necessary for network information, capabilities and modes, to configure an Enrollee for the wireless network and to report problems with the Enrollee associating with a specified wireless network with the supplied settings.

The Wi-Fi Protected Setup 1.0 standard defines three types of components in a network: a Registrar, an Enrollee, and an Access Point (AP). A Registrar is a component with the authority to issue and revoke credentials to a network. A Registrar may be integrated into an AP or it may be separate from the AP. An Enrollee is a component seeking to join a wireless LAN network. An Authenticator is an AP functioning as a proxy between a Registrar and an Enrollee. A Registrar wireless device configures the Enrollee wireless device, and the AP acts as an Authenticator to proxy the relevant messages between the Registrar and the Enrollee. The messages exchanged in the session are a series of Extensible Authentication Protocol (EAP) request/response messages, ending with the Enrollee reconnecting to the network with its new configuration. EAP is an authentication framework defined in RFC 5247, for providing the transport and usage of keying material and parameters needed to establish a secure Wi-Fi network. *The Wi-Fi Simple Configuration Specification*, Version 2.0, Dec. 20, 2010, (incorporated herein by reference), updates the *Wi-Fi Protected Setup Specification*, Version 1.0h.

A standalone AP that supports Wi-Fi Protected Setup, includes a built-in Registrar and does not use an external Registrar. In initial WLAN setup with Wi-Fi Protected Setup, when initializing in a standalone mode, a Wi-Fi Protected Setup AP automatically chooses a random SSID and channel. A standalone AP that includes a Wi-Fi Protected Setup Registrar, issues keys to Enrollees via the Registration Protocol.

When an Enrollee is initialized, it looks for Beacons from APs and sends probe requests with the WSC information element (IE), into either selected networks or into each network sequentially. It may also send probe requests to each IEEE 802.11 channel with the WSC IE included. It looks for the WSC IE in probe-responses that it receives and can engage with one or more Registrars to further discover Registrar capabilities and to see if the user has selected a Registrar. The Enrollee may continue looking for selected Registrar flags in Beacons, probe-responses and any M2 messages and may cease scanning when it finds a Registrar indicating that it is prepared to configure the Enrollee.

The following example describes an example in-band setup procedure using Wi-Fi Protected Setup for adding Member devices using a Standalone AP/Registrar. The user may convey the Enrollee's device password to the AP/Registrar using keyboard entry or an out-of-band channel with Near-Field Communication (NFC) Connection Handover. This example does not show the exchange of preliminary M1 and M2D messages that may take place after the probe message exchange, because the Enrollee may be waiting for the user to configure the AP/Registrar with the Enrollee's device password.

1. The Enrollee sends its Discovery data in a probe request to a Wi-Fi Protected Setup AP or ad hoc wireless Registrar. The AP or wireless Registrar responds with its own Discovery data in the probe response.

2. The user may be prompted to enter the Enrollee's device password into the AP/Registrar using a keypad interface or an out-of-band channel.

3. The Enrollee connects and initiates the IEEE 802.1X port-based Network Access Control procedure for port-based authentication.

4. The Enrollee and Registrar exchange messages M1-M8 to provision the Enrollee.

5. The Enrollee disassociates and reconnects, using its new WLAN authentication Credential. The Enrollee is now connected to the network with its new configuration.

3. Authentication in Wi-Fi Protected Setup/Wi-Fi Simple Configuration

The *Wi-Fi Simple Configuration Specification*, Version 2.0 (renamed from the original name "Wi-Fi Protected Setup"), uses the IEEE 802.1X Port-Based Authentication and Extensible Authentication Protocol (EAP) to transport in-band Registration Protocol messages. This protocol is mapped onto a custom EAP method described below. Wi-Fi Simple Configuration does not require the AP to support remote authentication dial-in user service (RADIUS) (IETF RFC 2865-2000), and the network need not include an authentication server. In fact, many Wi-Fi Simple Configuration APs may support IEEE 802.1X only to configure Wi-Fi Protected Access 2 (WPA2)-Personal Credentials using Wi-Fi Simple Configuration. Enrollees using Wi-Fi Simple Configuration are not granted direct access to the WLAN through the Wi-Fi Simple Configuration custom EAP method. The EAP method is used to configure the Enrollee with a Credential that can be used subsequently with whatever access method is supported by that WLAN. For example, if the AP only supports WPA2-Personal with a network-wide shared Pre-Shared Key (PSK), then the Enrollee would run the 802.1X exchange to obtain the PSK, disassociate, and then reconnect and use WPA2-Personal to access the WLAN. Alternatively, if the AP supports 802.1X authentication, the Enrollee may first run the Wi-Fi Simple Configuration EAP method to obtain a shared secret Credential and then reconnect using that secret in conjunction with another EAP method to access the WLAN.

The Wi-Fi Simple Configuration EAP method (EAP-WSC) can be used for Registrar and Enrollee discovery and for Credential establishment. The first time the Enrollee encounters a new WLAN, it sends out its Discovery information and executes the EAP-WSC method. In both the Discovery message and in Registration Protocol Message M1, the Enrollee provides information about itself to the WLAN. The M2 and M2D messages sent to the Enrollee likewise provide information about the available Registrars. When the Enrollee first discovers and attempts to connect to the WLAN, the WLAN's Registrar(s) may not yet know the Enrollee's device password. Therefore, Registrars without the device password respond with M2D messages. Although these M2D messages are unauthenticated, they can help Enrollees with rich user interfaces, to guide the user through the enrollment process.

As the Enrollee scans over the M2D messages sent by the network, it may discover that none of them possesses its device password. At this point, the Enrollee has an opportunity to prompt the user to perform a trust bootstrapping operation such as connecting an available out-of-band channel or entering a device password into one of the available Registrars. If the user decides to enter the Enrollee's device password into the Registrar, the Enrollee can reconnect and run the EAP method once more to perform the complete Registration Protocol. If the Enrollee has no user interface to lead the user through the enrollment, it is likely that one or more of the WLAN's Registrars can do this. Both the Registrar and the Enrollee are given sufficient information about each others' capabilities through the EAP method to successfully lead the user through the enrollment. If the user decides to use an out-of-band channel for registration, then message M2 is implicitly authenticated by the channel and can carry the network configuration data.

The AP functions as the EAP authenticator on the WLAN. Thus, the AP generates EAP Request messages and Enrollees and Registrars generate EAP Responses. If the Registrar is external to the AP, then it uses universal plug and play (UPnP) to exchange Registration Protocol messages with the AP. A Registrar may also function in the role of an 802.1X authenticator, which is useful for networks with legacy APs.

The Wi-Fi Simple Configuration EAP method uses EAP, as specified in RFC 3748, and Extensible Authentication Protocol (EAP) over LAN (EAPoL), as specified in IEEE 802.1X-2001, but does not represent a network authentication protocol. Rather Wi-Fi Simple Configuration utilizes the 802.1X data connection for acquiring settings necessary for connecting to the network and the resulting EAP exchange must always terminate with EAP-Failure.

When the Enrollee decides to connect to the network and run the Wi-Fi Simple Configuration EAP method, it associates with the AP and sends an EAPoL-Start message. The AP responds with an EAP-Request/Identity. The Enrollee sends an EAP-Response/Identity containing the defined Wi-Fi Alliance name for a Simple Configuration Enrollee ("WFA-SimpleConfig-Enrollee-1-0"). This causes the AP to start running the Simple Configuration EAP method. The Registration Protocol messages are exchanged until M8 is received and validated by the Enrollee. If it successfully processes M8, the Enrollee sends an EAP-Response/Done message to the authenticator, which sends the WSC_Done message to any External Registrar and the authenticator returns an EAP-Failure message to the Enrollee. An Enrollee should assume that the received credentials are valid after successfully processing message M8 and sending the WSC_Done message. The Enrollee then disassociates and reconnects with the Credential obtained from M8's ConfigData. If M2D is received by the Enrollee, it should respond with an ACK message so that the AP can continue to send it discovery messages from other Registrars. After the AP sends an EAP-failure to the Enrollee, the Enrollee can do one of two things (given that the AP did not de-authenticate the Enrollee after sending the EAP-Failure): it can disconnect from the AP and reconnect some time later to rerun the Wi-Fi Simple Configuration EAP method by sending an EAPoL-Start message or it can stay connected to the AP and rerun the Wi-Fi Simple Configuration EAP method by sending another EAPoL-Start message.

Once the Enrollee sends an M3 message, both the Registrar and the Enrollee must proceed in lock-step fashion until either a failure or until success occurs (indicated by the Done response message). If the Enrollee (IEEE 802.1X supplicant) detects any errors in these later phases, it responds by sending a NACK message and transitioning to the termination state to terminate the connection. At this point, the Enrollee computes a fresh device password for use in the next instance of the Registration Protocol. If the same password is reused with multiple instances of the protocol, it will be susceptible to active attack.

The Registration Protocol Messages M1 to M8 are described in the Wi-Fi Simple Configuration Specification, Version 2.0. They include an exchange of public keys, description of the sending device, including its MAC address and device capabilities, and various message authentication values, culminating in the Registrar sending to the Enrollee credentials for accessing the network.

A credential is a data structure issued by a Registrar to an Enrollee, allowing the latter to gain access to the network. With out-of-band configuration, WLAN credentials are sent across the out-of-band channel to the Enrollee. The NFC interfaces operating in peer-to-peer mode between an AP or Group Owner (GO) having an integrated Registrar and an Enrollee device, have the strongest security properties supported by the Wi-Fi Simple Configuration Specification, because practical man-in-the-middle attacks against NFC are not feasible. In this mode, a 1536-bit Diffie-Hellman exchange is performed over the NFC interface, and WLAN settings are encrypted using 128-bit Advanced Encryption Standard (AES) and delivered over the same interface between an AP or Group Owner (GO) and an Enrollee device. The Diffie-Hellman public keys and WLAN settings are implicitly authenticated by both the Registrar and the Enrollee, because they are received over the NFC channel.

The credential shown in the following Table 1, is a compound attribute issued by an AP or Group Owner (GO) having an integrated Registrar, representing a single WLAN Credential. There can be multiple instances of the credential attribute. The Wi-Fi Simple Configuration Specification provides the following table that lists the attributes in Credential ("R" means required and "O" means optional):

TABLE 1

Credential

| Attribute | R/O | Notes, Allowed Values |
|---|---|---|
| 1. Network Index | 2. R | 3. Deprecated - use fixed value 1 for backwards compatibility. |
| 4. SSID | 5. R | 6. SSID of network. |
| 7. Authentication Type | 8. R | 9. The authentication type used in this network. |
| 10. Encryption Type | 11. R | 12. The encryption type used in this network. |
| 13. Network Key Index | 14. O | 15. Deprecated. Only included by WSC 1.0 devices. Ignored by WSC 2.0 or newer devices. |
| 16. Network Key | 17. R | 18. |
| 19. MAC Address | 20. R | 21. Member device's MAC address. |
| 22. EAP Type | 23. O | 24. |
| 25. EAP Identity | 26. O | 27. |
| 28. Key Provided Automatically | 29. O | 30. |
| 31. 802.1X Enabled | 32. O | 33. |
| 34. Network Key Shareable (inside WFA Vendor Extension) | 35. O | 36. If present, this attribute indicates whether the Network Key can be shared or not with other devices. |
| 37. <other . . .> | 38. O | 39. Multiple attributes are permitted. |

4. Wi-Fi Direct—Software Access Points

The Wi-Fi Alliance has developed a Wi-Fi Peer-to-Peer technology named Wi-Fi Direct™ that is specified in the *Wi-Fi Alliance Peer-to-Peer Specification*, October 2010 (incorporated herein by reference). Wi-Fi Direct, is also referred to herein as Peer-to-Peer or P2P. Wi-Fi Direct enables IEEE 802.11a, g, or n devices to connect to one another, peer-to-peer, without prior setup or the need for wireless access points. Wi-Fi Direct embeds a software access point into any device, which provides a version of Wi-Fi Protected Setup. When a device enters the range of a STA supporting Wi-Fi Direct (a Wi-Fi Direct device), it can connect to it and then gather setup information using a Wi-Fi Protected Setup transfer. Devices that support Wi-Fi Direct may discover one another and advertise available services. Wi-Fi Direct devices support typical Wi-Fi ranges and the same data rates as can be achieved with an 802.11a, g, or n infrastructure connection. When a device enters the range of the Wi-Fi Direct device, it may connect to it using the existing protocol, and then gather setup information using a Wi-Fi Protected Setup 2.0 transfer.

Wi-Fi Direct enables IEEE 802.11 devices that support Wi-Fi Direct, to connect to one another, point-to-point, without joining a network. The specification may be implemented in any Wi-Fi device. Devices that support the specification will be able to discover one another and advertise available services. Wi-Fi Direct devices will support typical Wi-Fi ranges and the same data rates as can be achieved with an infrastructure connection. Wi-Fi Direct provides point-to-point connections for networks by embedding a software access point into any device that wishes to support Wi-Fi Direct. The soft AP provides a version of Wi-Fi Protected Setup 1.0 by entering a PIN or pressing a button. When a device enters the range of the Wi-Fi Direct device, it may connect to it using the existing protocol, and then gather setup information using a Wi-Fi Protected Setup 1.0 transfer.

Wi-Fi Direct-certified devices may create direct connections between Wi-Fi client devices without requiring the presence of a traditional Wi-Fi infrastructure network of an access point or router. Wi-Fi Direct-certified devices support connection with existing legacy Wi-Fi devices using the IEEE 802.11a/g/n protocols. Wi-Fi Direct Device Discovery and Service Discovery features allow users to identify available devices and services before establishing a connection, for example, discovering which Wi-Fi networks have a printer. Wi-Fi Direct devices may use Wi-Fi Protected Setup to create connections between devices.

A Wi-Fi Direct device is capable of a peer-to-peer connection and may support either an infrastructure network of an access point or router or a peer-to-peer (P2P) connection. Wi-Fi Direct devices may join infrastructure networks as stations (STAs) and may support Wi-Fi Protected Setup enrollee functionality. Wi-Fi Direct devices may connect by forming Groups in a one-to-one or one-to-many topology. The Groups functions in a manner similar to an infrastructure basic service set (BSS). A single Wi-Fi Direct device will be the Group Owner (GO) that manages the Group, including controlling which devices are allowed to join and when the Group is started or terminated. The Group Owner (GO) will appear as an access point to legacy client's devices.

Wi-Fi Direct devices include a Wi-Fi Protected Setup Internal Registrar functionality and communication between Clients in the Group. Wi-Fi Direct devices may be a Group Owner (GO) of a Group and may be able to negotiate which host device Adopts this role when forming a Group with another Wi-Fi Direct device. A Group may include both Wi-Fi Direct devices and legacy devices (i.e., that are not compliant with the Wi-Fi Alliance Peer-to-Peer Specification). Legacy Devices can only function as Clients within a Group.

Wi-Fi Direct devices may support Discovery mechanisms. Device Discovery is used to identify other Wi-Fi Direct devices and establish a connection by using a scan similar to that used to discover infrastructure access points. If the target is not already part of a Group, a new Group may be formed. If the target is already part of a Group, the searching Wi-Fi Direct device may attempt to join the existing Group. Wi-Fi Protected Setup may be used to obtain credentials from the Group Owner (GO) and authenticate the searching Wi-Fi Direct device. Wi-Fi Direct devices may include Service Discovery that enables the advertisement of services supported by higher layer applications to other Wi-Fi Direct devices. Service Discovery may be performed at any time (e.g. even before a connection is formed) with any other discovered Wi-Fi Direct device.

A Group may be created by a single Wi-Fi Direct device, such as when connecting a legacy device. When forming a connection between two Wi-Fi Direct devices, a Group may be formed automatically and the devices may negotiate to determine which device is the Group Owner. The Group Owner may decide if this is a temporary (single instance) or persistent (multiple, recurring use) Group. After a Group is formed, a Wi-Fi Direct device may invite another Wi-Fi Direct device to join the Group. The decision of whether or not to accept an invitation may be left to the invited Wi-Fi Direct device.

Concurrent Wi-Fi Direct Devices may participate in multiple Groups, simultaneously, each group requires own Wi-Fi stack. A Wi-Fi Direct Device that may be in a Group while maintaining a WLAN infrastructure connection at the same time is considered a Concurrent Device or a dual stack device. For example, a laptop connected directly to a printer while simultaneously using a WLAN connection is operating as a Concurrent Device. Concurrent connections may be supported by a single radio and may support connections on different channels. Concurrent operation may be supported by multiple protocol stacks, for example, one for operation as a WLAN-STA and one for operating as a Wi-Fi Direct device. For example, two separate physical MAC entities may be maintained, each associated with its own PHY entity, or they may use a single PHY entity supporting two virtual MAC entities.

The *Wi-Fi Peer-to-Peer Technical Specification* v1.1, 2010 published by the Wi-Fi Alliance, provides for provisioning in Wi-Fi Direct networks. Provisioning is a phase of peer-to-peer group formation in which credentials for the peer-to-peer group are exchanged based on the use of Wi-Fi Simple Configuration. Credentials are information that is required to join a peer-to-peer group as defined in the Wi-Fi Simple Configuration Specification.

To allow for peer-to-peer device configuration, peer-to-peer devices may delay starting the provisioning phase until the expiration of the larger of the peer-to-peer group owner's (GO) configuration time and the peer-to-peer client's client configuration time, based on respective configuration timeout attributes exchanged during a preceding group owner negotiation.

The peer-to-peer device selected as peer-to-peer group owner (GO) during group owner negotiation may start a peer-to-peer group session using the credentials it intends to use for that group. The peer-to-peer group owner (GO) may use the operating channel indicated during group owner negotiation, if available. The peer-to-peer client may connect to the peer-to-peer group owner to obtain credentials. If the operating channel is not available the peer-to-peer group owner may use another channel from a channel list attribute sent in the group owner negotiation confirmation frame. The peer-to-peer client may have to scan to find the peer-to-peer group owner if the intended operating channel is not available. A group formation bit in a peer-to-peer group capability bitmap of the peer-to-peer capability attribute may be set to one until provisioning succeeds.

Provisioning may be executed in Wi-Fi Direct networks, as described, for example, in the *Wi-Fi Simple Configuration (WSC) Specification*, Version 2.0, Dec. 20, 2010. The peer-to-peer group owner (GO) may serve the role as the access point with an internal registrar. It will only allow association by the peer-to-peer device that it is currently with in a group formation. Since the user has entered the WSC PIN or triggered the WSC pushbutton functionality on both devices, the registrar may send an M2 message in response to an M1 message. The peer-to-peer client may serve the role as the STA enrollee. It may associate to the peer-to-peer device that it is currently with in the group formation.

If provisioning fails, then group formation ends and the peer-to-peer group owner (GO) may end the peer-to-peer group session. If provisioning fails, the peer-to-peer device may retry group formation or return to device discovery. On successful completion of provisioning in Wi-Fi Direct networks, the peer-to-peer group owner (GO) may set the group formation bit in the peer-to-peer group capability bitmap of the peer-to-peer capability attribute to zero. At this point the peer-to-peer client may join the peer-to-peer group in the Wi-Fi Direct network, using the credentials supplied during provisioning.

D. Near-Field Communication (NFC) Technology

One of the methods provided by the *Wi-Fi Simple Configuration Specification*, Version 2.0, is the Near-Field Communication (NFC) method, in which the user brings a new wireless client device (STA) close to an access point (AP) or Registrar of the Network to allow near field communication between the devices.

Near field communication technologies, such as radio frequency identification (RFID) technologies, comprise a range of RF transmission systems, for example standardized and proprietary systems for a large number of different purposes, such as product tagging for inventory handling and logistics, theft prevention purposes at the point of sale, and product recycling at the end of the life-cycle of the tagged product. In addition to RFID technologies, Near Field Communication (NFC) technology has recently evolved from a combination of existing contactless identification and interconnection technologies. NFC is both a "read" and "write" technology. Communication between two NFC-compatible devices occurs when they are brought within close proximity of each other: A simple wave or touch can establish an NFC connection, which is then compatible with other known wireless technologies, such as Bluetooth™ or wireless local area network (WLAN).

Near-field communication (NFC) technology used in the Wi-Fi Protected Setup (WPS) standard, communicates between two NFC Devices or between an NFC Host device And an NFC Tag via magnetic field induction, where two loop antennas are located within each other's near field, effectively energizing a wireless contact by forming an air-core transformer. An example NFC radio operates within the unlicensed radio frequency ISM band of 13.56 MHz, with a bandwidth of approximately 2 MHz over a typical distance of a few centimeters. The NFC radio may be affixed to a new wireless client device (STA) and the user brings the NFC radio on the device close to an access point (AP) or Registrar of the Network to allow near field communication between the devices. NFC technology is an extension of the ISO/IEC 14443 proximity-card standard (incorporated herein by reference) for contactless smartcards and radio frequency ID (RFID) devices, which combines the interface of a contactless smartcard and a reader into a single device, and uses the ISO/IEC 18092 NFC communication standard (incorporated herein by reference) to enable two-way communication. An NFC radio may communicate with both existing ISO/IEC 14443 contactless smartcards and readers, as well as with other NFC devices by using ISO/IEC 18092. The NFC Forum™, a non-profit industry association, has released specifications that enable different operation modes called: tag emulation, read/write mode, and peer to peer communication. Furthermore, NFC Forum has defined specifications for NFC Data Exchange Format (NDEF), NFC Tag Types, NFC Record Type Definition, and Connection Handover Specification. See, for example, *Connection Handover Technical Specification*, NFC Forum™, Connection Handover 1.2, NFCForum-TS-ConnectionHandover_1.2, 2010-07-07 (incorporated herein by reference). The ISO/IEC 18092 standard defines communication modes for Near Field Communication Interface and Protocol (NFCIP-1) using inductively coupled devices operating at the center frequency of 13.56 MHz for interconnection of computer peripherals. The ISO/IEC 18092 standard specifies modulation schemes, codings, transfer speeds and frame format of the RF interface, initialization schemes, conditions required for data collision control during initialization, and a transport protocol including protocol activation and data exchange methods.

E. NFC Connection Handover to WLAN

The basic handover to a WLAN carrier stores WLAN parameters and credentials on NFC Forum Tags as part of Wi-Fi Protected Setup (WPS). The information is stored in the payload of an NFC Data Exchange Format (NDEF) record identified by the mime-type "application/vnd.wfa.wsc", known as the "WPS Record". The wireless LAN parameters and credentials information provided inside a WPS Record includes the IEEE 802.11 Service Set Identifier (SSID), authentication and encryption type deployed by the wireless network, the secret network key that a wireless station needs to authenticate with the network, and the MAC address of the device receiving the configuration (if unknown, this address is set to all-zeros). The Wi-Fi Protected Setup specification 1.0 uses the term "Registrar" for a device that is able to provide WLAN credentials and "Enrollee" for a device that wants to join a wireless network.

In the *Wi-Fi Simple Configuration Specification*, Version 2.0, Dec. 20, 2010, a Handover Requester with Wi-Fi capability may format an NFC Handover Request Message in the NFC Data Exchange Format (NDEF), which indicates that the requester is an IEEE 802.11 device, but which does not include any configuration information. A Handover Request may be sent via the NFC link in at least two scenarios: [1] the requester may not have yet joined a wireless domain or [2] even if the requester is already member of a WLAN network, a peer device may be in a different network and thus a Connection Handover is required to obtain the peer device's credentials. In the Wi-Fi Protected Setup specification 2.0, the Handover Selector would deduce from this message that the Handover Requester supports a Wi-Fi certified IEEE 802.11 radio. In the Wi-Fi Protected Setup specification 2.0, if the Handover Selector is a Wi-Fi device with wireless connectivity, it should respond with an NFC Handover Select Message in the NFC Data Exchange Format (NDEF), with a configuration record that includes credentials, such as network index, SSID, authentication type, encryption type, network key, and MAC address.

The NFC Data Exchange Format (NDEF) specification, *NFC Forum Data Exchange Format (NDEF) Specification*, NFC Forum™, 2006 (incorporated herein by reference), defines a common data format for NFC devices to exchange application or service specific data. An NDEF message is constructed of a number of NDEF records, with the first and the last record providing message begin and end markers. Between two NFC Devices, NDEF messages may be exchanged over the NFC Logical Link Control Protocol (LLCP) protocol, specified in *NFC Forum Logical Link Control Protocol Specification*, NFC Forum™, 2009 (incorporated herein by reference). The NFC Connection Handover specification, *NFC Forum Connection Handover Specification*, NFC Forum™, 2010 Jul. 7 (incorporated herein by reference), defines the exchange of NDEF messages between two NFC Devices in a negotiated handover to discover and negotiate alternative wireless communication technologies.

The Handover Requester in the Wi-Fi Protected Setup specification 2.0, would then typically use the SSID and Network Key to enroll on the same Wi-Fi network to which the Handover Selector is connected. Further actions depend on the provision of an IP address identifying the Handover Selector, the available services, and the Handover Requester's intended activity.

F. Controlling Network Access to Guest Apparatus Based on Presence of Host

Example embodiments of the invention enable short-range communication carrier transport for access control in device-to-device communication with an access point device (AP) in an infrastructure network. FIG. 1A illustrates an example arrangement where host device A, such as a cellular telephone, PDA, laptop computer, and the like, includes an in-band short-range carrier transceiver such as an IEEE 802.11 WLAN transceiver 10A. The host device A further includes an out-of-band short-range carrier transceiver, such as a Near Field Communication (NFC) transceiver 12A, as the medium to detect the proximity of another wireless device to which access rights may be given. In an alternate example embodiment of the invention, the out-of-band short-range carrier transceiver may be a Bluetooth transceiver 12A', as the medium to detect the proximity of another wireless device to which access rights may be given. In another alternate example embodiment of the invention, an in-band short-range communication carrier transport may be used for access control, such as IEEE 802.11 WLAN communication protocol, as the medium to detect the proximity of another wireless device to which access rights may be given.

FIG. 1A further illustrates guest device B in the example arrangement, such as a cellular telephone, PDA, laptop computer, and the like, includes an in-band short-range carrier transceiver, such as an IEEE 802.11 WLAN transceiver 10B. Guest device B is shown as initially not being connected to any WLAN network. The guest device B also includes an out-of-band short-range carrier transceiver, such as a Near Field Communication (NFC) transceiver 12B, as the medium to detect the proximity of another wireless device to which access rights may be given. In an alternate example embodiment of the invention, the out-of-band short-range carrier transceiver may be a Bluetooth transceiver 12B', as the medium to detect the proximity of another wireless device to which access rights may be given. In another alternate example embodiment of the invention, an in-band short-range communication carrier transport may be used for access control, such as IEEE 802.11 WLAN communication protocol, as the medium to detect the proximity of another wireless device to which access rights may be given.

FIG. 1A further illustrates access rights server 35 connected over a backbone network 37 to the access point device AP, also referred to as control node, and to the network 39, such as a local area network or a wide area network such as the Internet or the public switched telephone network. The control node may be the access point AP or another node for example in an embodiment where the overall network includes several access points. In an example embodiment of the invention, the control node may include some or all of the functional components of the access rights server 35.

In an example alternate embodiment of the invention, the access point device may be a Group Owner device in a peer-to-peer (P2P) network, instead of the access point AP shown in the FIG. 1A, and then the access rights server 35 may be embodied as an integral part of the Group Owner device instead of being connected over the backbone network 37. The access rights server 35 may comprise host profile data 42, an access point AP database 44, a provisioning module 46, an authentication module 48, a host-to-access point proximity buffer 50, and a guest to access point proximity buffer 52.

In an example embodiment of the invention, the user of the host device A may own, host, manage, or administer the access point AP and wireless short-range communication network managed by the access point AP.

The host profile data 42 in the access rights server 35, is information describing the host user and/or host device and subscription data corresponding to the access point AP or resource for which the user is the host or owner.

The access point AP database 44 in the access rights server 35, stores data for the various access rights, resource information, credential data, and the like associated with accessing the access point AP.

The provisioning module 46 in the access rights server 35, enables the host to select what resources are to be shared with the guest to whom the host will be giving access. The provisioning module enables the host to establish or define the one or more access rights to be assigned to the guest device B for accessing the access point AP. The provisioning module may receive data from the host device A for defining the access rights, the resources involved, and the like. The provisioning module may receive and process input for indicating one or more conditions for enabling access of the access point AP by the guest device B, including proximity based conditions.

The authentication module 48 in the access rights server 35, authenticates users and user devices for interaction with the access rights server 35. The authentication module may receive input for indicating one or more access credentials for the guest device B to access the access point AP that is owned or operated by the user of the host device B, including a password or key associated with the access point AP.

The host-to-access point proximity buffer 50 in the access rights server 35, maintains the current state of whether the host device A continues to be communicating with the access point AP, and this status is buffered in the proximity buffer 50.

The guest-to-AP proximity buffer 52 in the access rights server 35, maintains the current state of whether the guest device B continues to be communicating with the access point AP, and this status is buffered in the proximity buffer 52.

In example embodiments of the invention, the access point AP may include some or all of the functional components of the access rights server 35, and may be referred to as a control node.

FIG. 1A further illustrates the social network server 36 connected over the backbone network 37 to the access rights server 35, to the access point device AP, and to the network 39. The access rights server 35 may interact with a social network server 36 for maintaining data regarding one or more users (e.g., contacts) associated with the host device A. The social network server 36 may be used by the access rights server 35 for cross referencing one or more users requesting access to a resource against the users and resources specified for access by the host device A. For example, the social network server 36 may be viewed from the perspective of a social network service such as Facebook or LinkedIn.

The social network server 36 may maintain a listing of various members and/or social networking group affiliations of those members as related to the user of host device A. Each member of the social network server 36 may register with the service provider of the social network server 36 by creating a profile for specifying personal details, interests, information sharing restrictions, marketing preferences, etc. In addition, the members are assigned or create a user name, a login password, a security question and the like as access credentials for the social network server 36. As a registered member, the user of host device A may communicate with the various other members of the social network server 36 as well, including communication messages and exchanging files.

The social network server 36 may include current friend lists of users who have associated with the user of the host device A. The access rights server 35 may determine what access rights are made available to the one or more members of the current friends list. Access rights may be based, for example, on whether a relationship identifier of such a member matches criteria required by the user of the host device A, for satisfying the access rights. It is noted that the user of the host device A may be an individual person, a group, a company or organization, a website, etc. In an example embodiment of the invention, the users of the host device A and the guest device B are socially linked by the social network server 36.

In FIG. 1B1, host device A is shown as having joined a WLAN network by having formed an IEEE 802.11 in-band short-range carrier communication connection with the access point device AP. The access point AP reports this status to the access rights server 35, which sets the host-to-AP proximity buffer "=1".

Figure 2A:
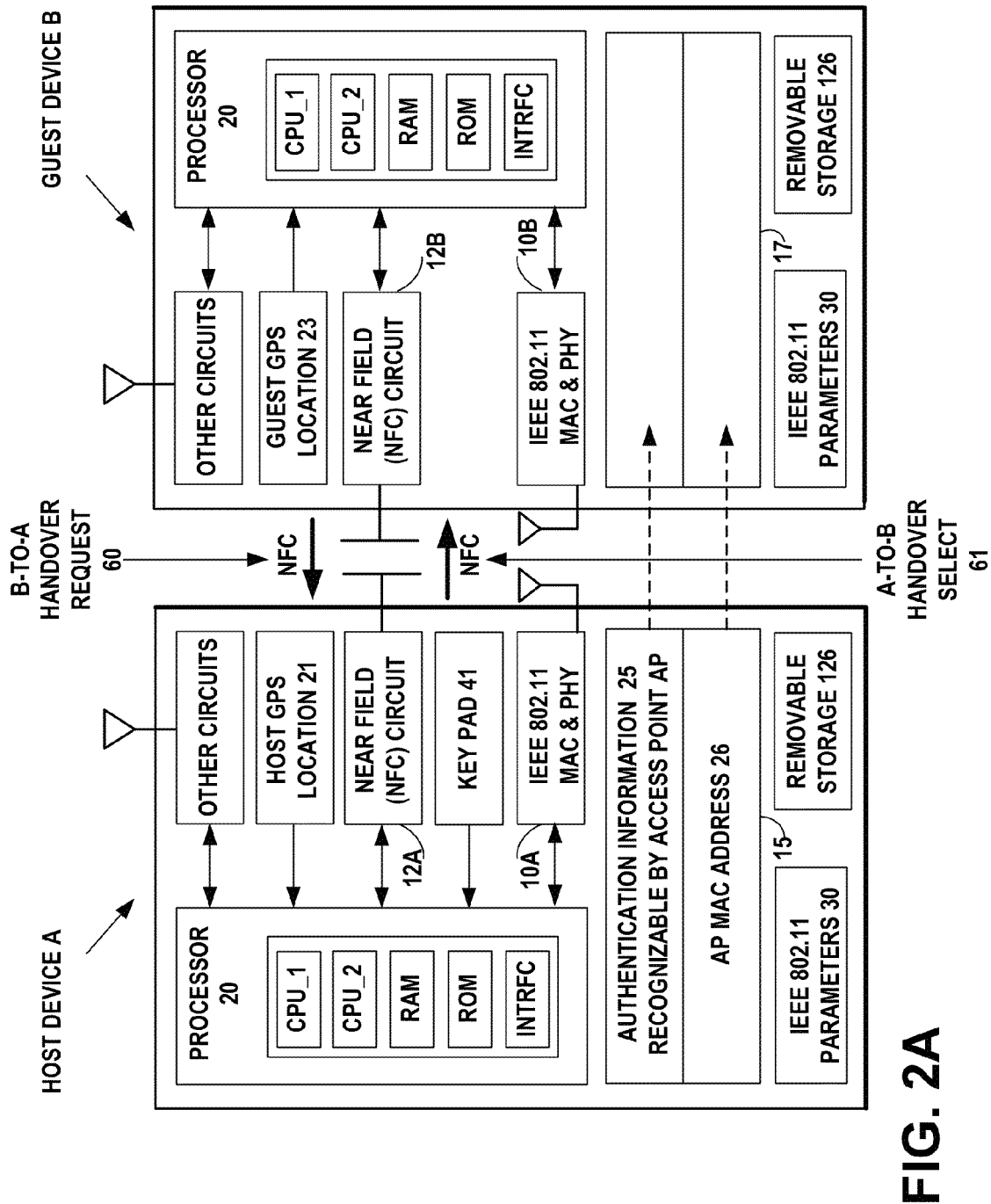
FIG. 2A is an example functional block diagram of host device A and guest device B of FIG. 1A, showing each device equipped an out-of-band NFC transceiver and an in-band short-range carrier transceiver, in accordance with example embodiments of the invention.

The host device A may receive an input from a user of the host device A via a user interface, such as key pad 41 shown in FIG. 2A, to grant access rights to the wireless short-range communication network managed by the access point AP, granting such rights to a user of the guest device B when the host device A is present within coverage of the wireless short-range communication network managed by the access point AP.

FIG. 1B1 further shows the host device A transmitting one or more wireless messages to the access point AP, containing access rules 13 to be provisioned by the access rights server 35 to enable the guest device B to access the access point AP. In accordance with an example embodiment of the invention, the access rules 13, also referred to as an access grant message, may specify that the guest device B may gain access to the access point AP only when both the host device A and the guest device B are present within the coverage area of the access point or the WLAN network. The access point AP uploads the proximity access rules 13 to the access rights server 35. The proximity access rules 13 may be stored in the authentication module 48 of the access rights server 35.

FIG. 1B2 illustrates the example network diagram of FIG. 1A, wherein host device A is shown transmitting the proximity access rules 13 to the access rights server 35 on a different path through another access point 10 connected to the access rights server 35 through the Internet. Other communication paths, such as via a cellular telephone connection, may provide a direct path to the access rights server 35 that is different from the path through the access point AP, as was shown in FIG. 1B1, in accordance with example embodiments of the invention.

In an example embodiment of the invention, the proximity distance may be defined in terms of the communications technology used to detect how close the host device A is to the access point AP and how close the guest device B is to the access point AP. For example, if the proximity were to be detected using the Near Field Communication (NFC) communications protocol, the threshold distance for detection will be the approximate range of the NFC transceiver, on the order of one centimeter. As another example, if the proximity is detected using the Bluetooth communications protocol, the threshold distance for detection will be the approximate range of the Bluetooth transceiver, on the order of ten meters. As still another example, if the proximity is detected using the IEEE 802.11 WLAN communications protocol, the threshold distance for detection will be the approximate range of the IEEE 802.11 WLAN transceiver, on the order of one 100 meters.

In an example embodiment of the invention, the detection by the access point device AP that both the host device A and the guest device B are within its coverage area, may be based on known cell-id reported by the host device A or guest device B, it may be based on the detection of the access point AP (or a set of access points in the vicinity to the access point AP that the guest is to visit), or it may be defined as a location based, for example, on cellular or GPS based location information. In an example embodiment of the invention, the guest device B may connect to the access point AP only when the host device A is also present to control and monitor the use of the access point AP. If the host device A is not present, then the connection is prevented.

In an example embodiment of the invention, the access control may be automatic, it may be manually accepted, or it may employ semi-automated options.

In an example embodiment of the invention, the implementation depends on the communication protocol used for the proximity detection. Bluetooth scanning, IEEE 802.11 WLAN scanning, or NFC-based detection may be implemented, so that the host device A performs the scanning on a regular basis while being within the coverage area of the access point AP. If the known guest device B is detected by the host device A, this information may be delivered from the host device A, via the access point AP, to the access rights server 35 handling the commissioning of the credentials for the guest device B to access the access point AP. When the access rights server 35 determines that both the guest device B and the host device A are within the coverage area of the access point AP and has received from the host device A the authorized access approval for the detected guest device B, the access rights server 35 will configure the access point AP to enable access by the guest device B. Once the access rights server 35 determines that either the host device A or the guest device B is no longer within the coverage area of the access point AP, the access rights server 35 will revoke from the guest device B, the credentials for accessing the access point AP.

In an example embodiment of the invention, the host device A may grant access rights to the guest device B based on the presence of any device belonging to a device group of which the host device A is a member. The access would be granted whenever any of the devices in the group are present within the network coverage of the access point AP and the guest device B is also present within the coverage area. The guest device will receive a revocation of the access rights to the network from the access point device, when the guest device or all devices in a group of which the first device is a member, are no longer within coverage of the access point or the wireless short-range communication network.

Figure 1C:
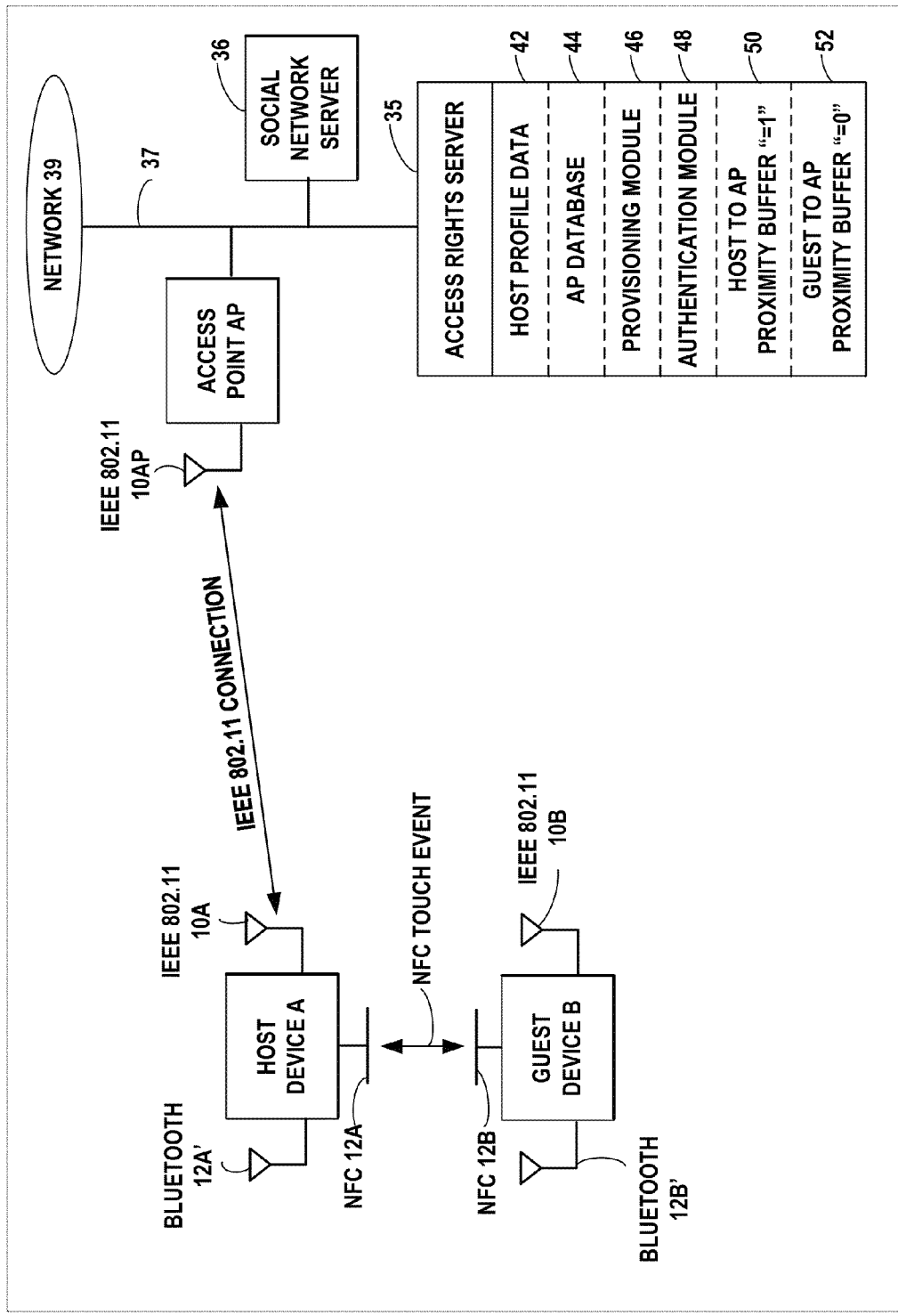
FIG. 1C illustrates the example network diagram of FIG. 1B1, wherein an NFC touch event is conducted between host device A and guest device B in order to initiate granting access rights to the guest device B to enable accessing the access point AP, in accordance with example embodiments of the invention.

FIG. 1C illustrates the example network diagram of FIG. 1B1, wherein an NFC touch event is conducted between host device A and guest device B in order to initiate granting access rights to the guest device B to enable accessing the access point AP, in accordance with example embodiments of the invention. The user of host device A would like to include guest device B in the WLAN network by having it automatically connect to the access point AP and acquire credentials for network access, without requiring the user to type in a PIN number. To accomplish this, the user of host device A touches the NFC transponder of host device A to the NFC transponder of guest device B in order to initiate a short-range carrier transport switch procedure with guest device B. The NFC touch results in transmitting NFC wireless out-of-band short-range carrier communication signals for providing an NFC out-of-band short-range carrier communication connection with guest device B. The figure shows that the host device A continues to be within the WLAN coverage area, over its IEEE 802.11 in-band short-range carrier communication connection with the access point AP.

Figure 1D:
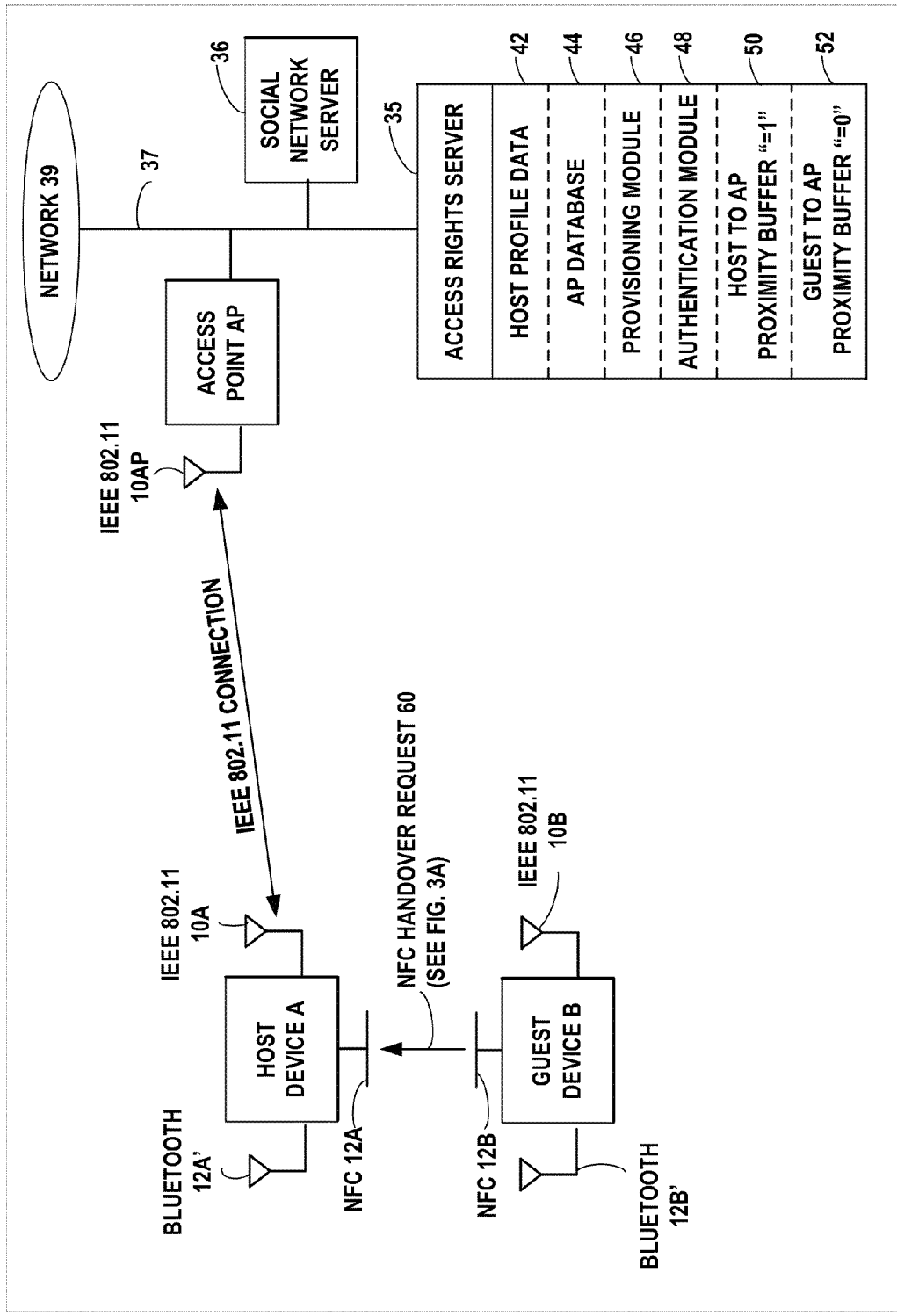
FIG. 1D illustrates the example network diagram of FIG. 1C, of one example wherein guest device B sends an NFC handover request to host device A, in accordance with example embodiments of the invention.

FIG. 1D illustrates one example of guest device B sending an NFC handover request 60 of FIG. 3A, to host device A. When the NFC selector host device A has established LLCP communication with the NFC requestor guest device B, the requestor guest device B sends a handover request message 60, shown in FIG. 3A, to host device A, with its request for information to enable guest device B to obtain network access through the access point AP.

Figure 1E:
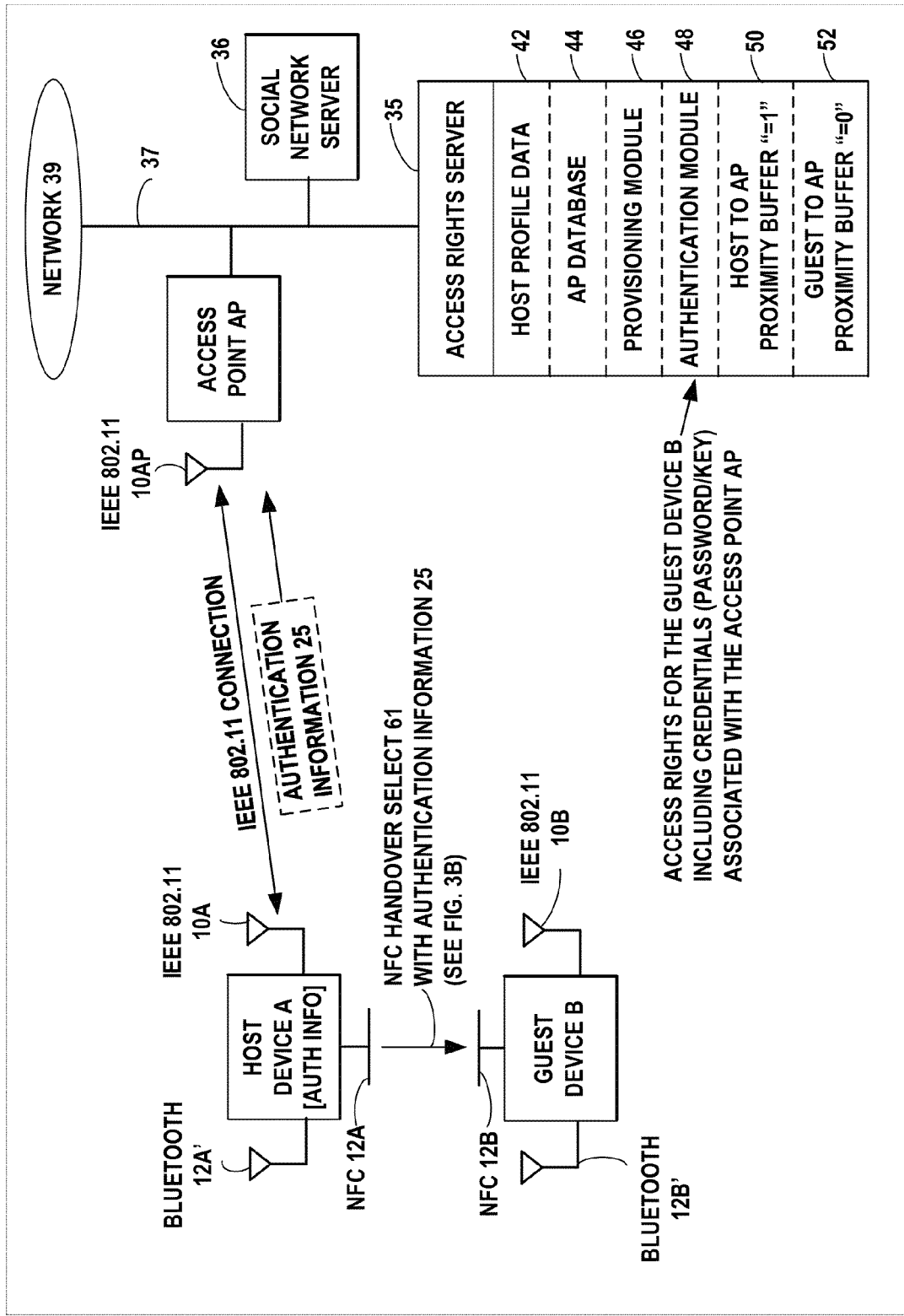
FIG. 1E illustrates the example network diagram of FIG. 1D, of one example wherein host device A responds to the guest device B with an NFC handover select that includes the authentication information that is recognizable by the access point AP and connection information. The host device A may also transmit the authentication information to the access point AP via the IEEE 802.11 in-band short-range carrier communication connection, in accordance with example embodiments of the invention.

FIG. 1E illustrates one example of host device A responding with an NFC handover select that includes the authentication information 25. The NFC selector host device A then responds by sending to guest device B, a handover select response message 61, shown in FIG. 3B, including the authentication information 25, such as a password or key, and connection information, such as the MAC address 26 of the access point AP, to carry out a connection setup between guest device B and the access point AP.

The authentication information 25 is also transmitted by the host device A to the access point AP, over its IEEE 802.11 in-band short-range carrier communication connection with the access point AP. The authentication information, such as a password or key, is passed by the access point AP over the backbone network 37 to the access rights server 35. The authentication module in the access rights server 35 stores the authentication information, such as a password or key, to compare with credentials to be submitted by the guest device B when it accesses the access point AP. This will enable guest device B to setup an IEEE 802.11 in-band short-range carrier communication connection with the access point AP according to the IEEE 802.11 in-band short-range carrier communication connection parameters.

The authentication information 25 is recognizable by the access point AP, the authentication information having been obtained by the guest device B when it engaged in the NFC touch while proximate to host device A. The authentication information 25 may include, for example, a random number or a value based on public key encryption that was previously generated as the authentication information by the host device A. The host device A may generate unique random numbers to improve security. This random number or cryptographic information value may be sent during connection setup and may be refreshed at any time later, for example in a periodic refresh. The authentication information 25 may include device password (PIN), public key encryption, Diffie-Hellman key exchange, or Advanced Encryption Standard (AES) symmetric key exchange.

Host device A may also send to guest device B, IEEE 802.11 in-band short-range carrier communication connection parameters for connection to the access point AP, such as the MAC address of the access point AP, via the NFC out-of-band short-range carrier communication connection.

After the NFC touch procedure, the guest device B possesses the authentication information 25 recognizable by the access point AP, the authentication information having been obtained by the guest device B when it engaged in the NFC touch while proximate to host device A.

In an alternate example embodiment of the invention, prior to granting the access rights to the guest device B, the access rights server 35 may send the identity of the user of the guest device B to the social network server 36 to determine if that user is included in the current friend lists of users who have associated with the user of the host device A. The access rights server 35 may determine what access rights are made available to the one or more members of the current friends list. Access rights may be based, for example, on whether a relationship identifier of such a member matches criteria required by the user of the host device A, for satisfying the access rights. The access rights server 35 may deny granting access rights to guest device B, in this example embodiment, if the user of the guest device B is not included in the current friend lists of users who have associated with the user of the host device A.

In an example embodiment of the invention, the access point AP may directly transmit to the guest device B the authentication information 25, once a WLAN connection setup has been established between the guest device B and the access point AP.

Figure 1F:
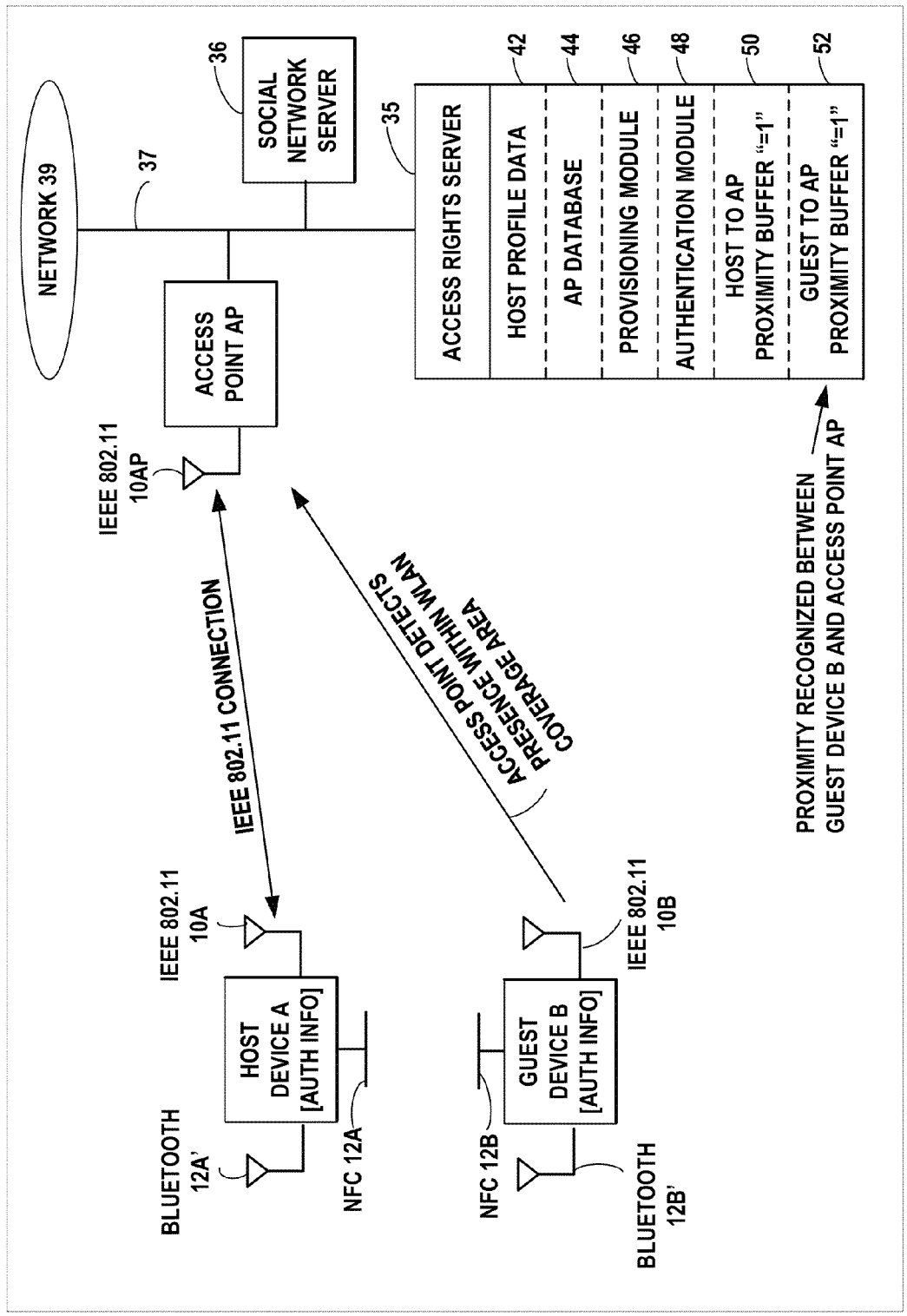
FIG. 1F illustrates the example network diagram of FIG. 1E, wherein the access point detects the presence of the guest device B within the WLAN coverage area, in accordance with example embodiments of the invention.

FIG. 1F illustrates the example network diagram of FIG. 1E, wherein the access point AP detects the presence of the guest device B within the WLAN coverage area, over its IEEE 802.11 in-band short-range carrier communication connection with the access point AP according to the IEEE 802.11 in-band short-range carrier communication connection parameters, in accordance with example embodiments of the invention. This status is passed by the access point AP over the backbone network 37 to the access rights server 35. The guest-to-access point proximity buffer 52 in the access rights server 35 buffers the current state of proximity of the guest device B to the access point AP, which is shown in FIG. 1F as the binary value "=1", indicating that proximity of the guest device B to the access point AP has been detected. The guest device B may, for example, now move away from the close, NFC touch position that it had with the host device A, since now it's location within the WLAN coverage area has been detected. The figure shows that the host device A continues to be within the WLAN coverage area, over its IEEE 802.11 in-band short-range carrier communication connection with the access point AP.

In an example embodiment of the invention, the guest device B may report its current location to the host device A in a GPS update message, as measured by its onboard GPS detector 23, and the host device A may pass on that location information to the access rights server 35 via the access point AP.

Figure 1G:
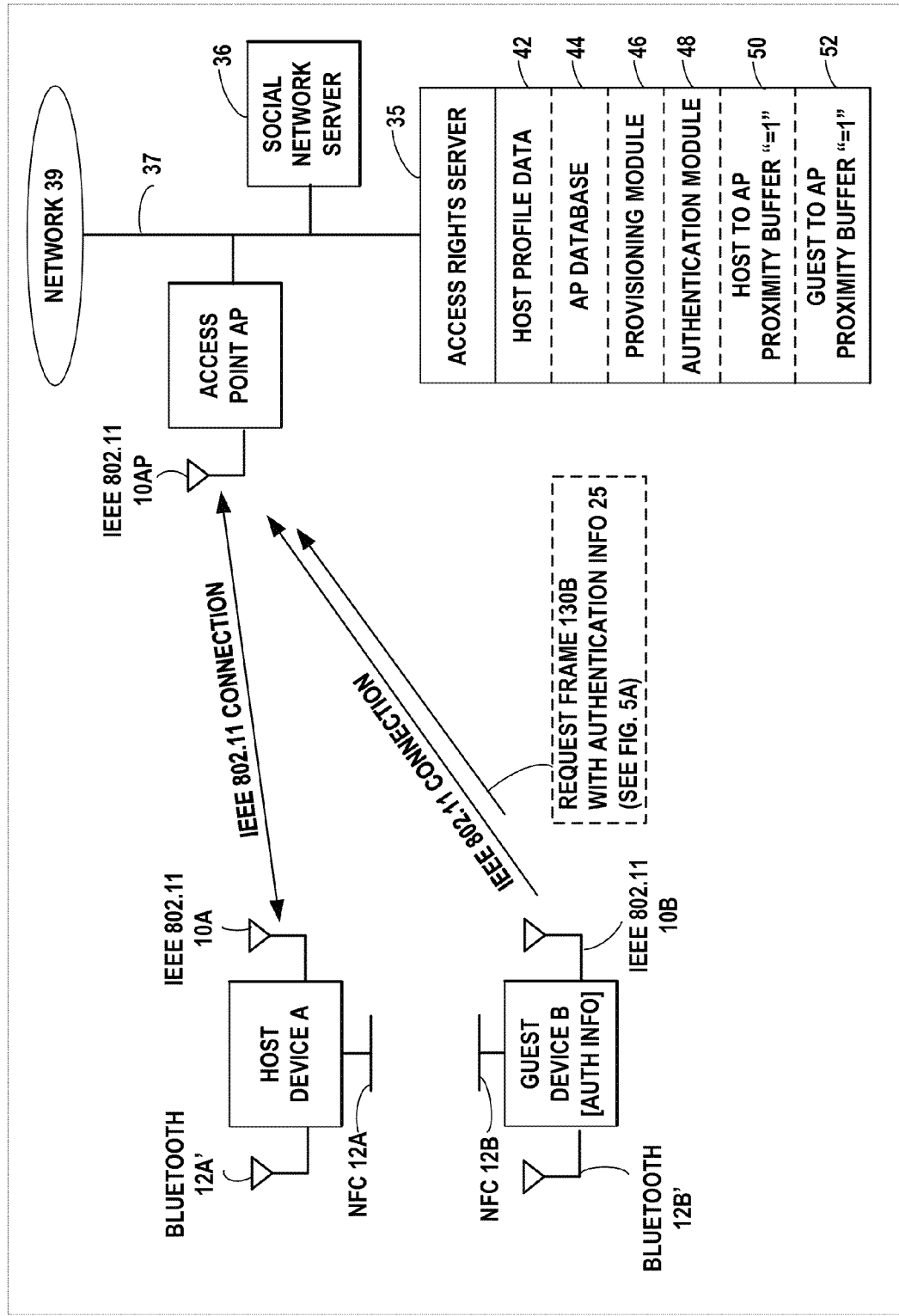
FIG. 1G illustrates the example network diagram of FIG. 1F, wherein guest device B sends a request frame, for example a probe request frame, with a Wi-Fi Protected Setup (WSC) information element (IE) to the access point AP in a Wi-Fi Protected Setup procedure. The WSC information element (IE) of includes the authentication information recognizable by the access point AP, in accordance with example embodiments of the invention.

FIG. 1G illustrates the example network diagram of FIG. 1F, wherein an example guest device B is issuing a request frame, for example a probe request frame 130B with a Wi-Fi Protected Setup (WSC) information element (IE) of FIG. 5A, sending it to the access point AP in a Wi-Fi Protected Setup procedure. The WSC information element (IE) of FIG. 5A may include the authentication information 25 recognizable by the access point AP, in accordance with example embodiments of the invention. The guest-to-AP proximity buffer 52 in the access rights server 35 buffers the current state of proximity of the guest device B to the access point AP, which is shown in FIG. 1G as the binary value "=1", indicating that proximity of the guest device B to the access point AP continues to be detected.

In an example embodiment of the invention, the guest device B may report its current location directly to the access point AP in a GPS update message, as measured by its onboard GPS detector 23, and the access point AP may pass on that location information to the access rights server 35.

Figure 1H:
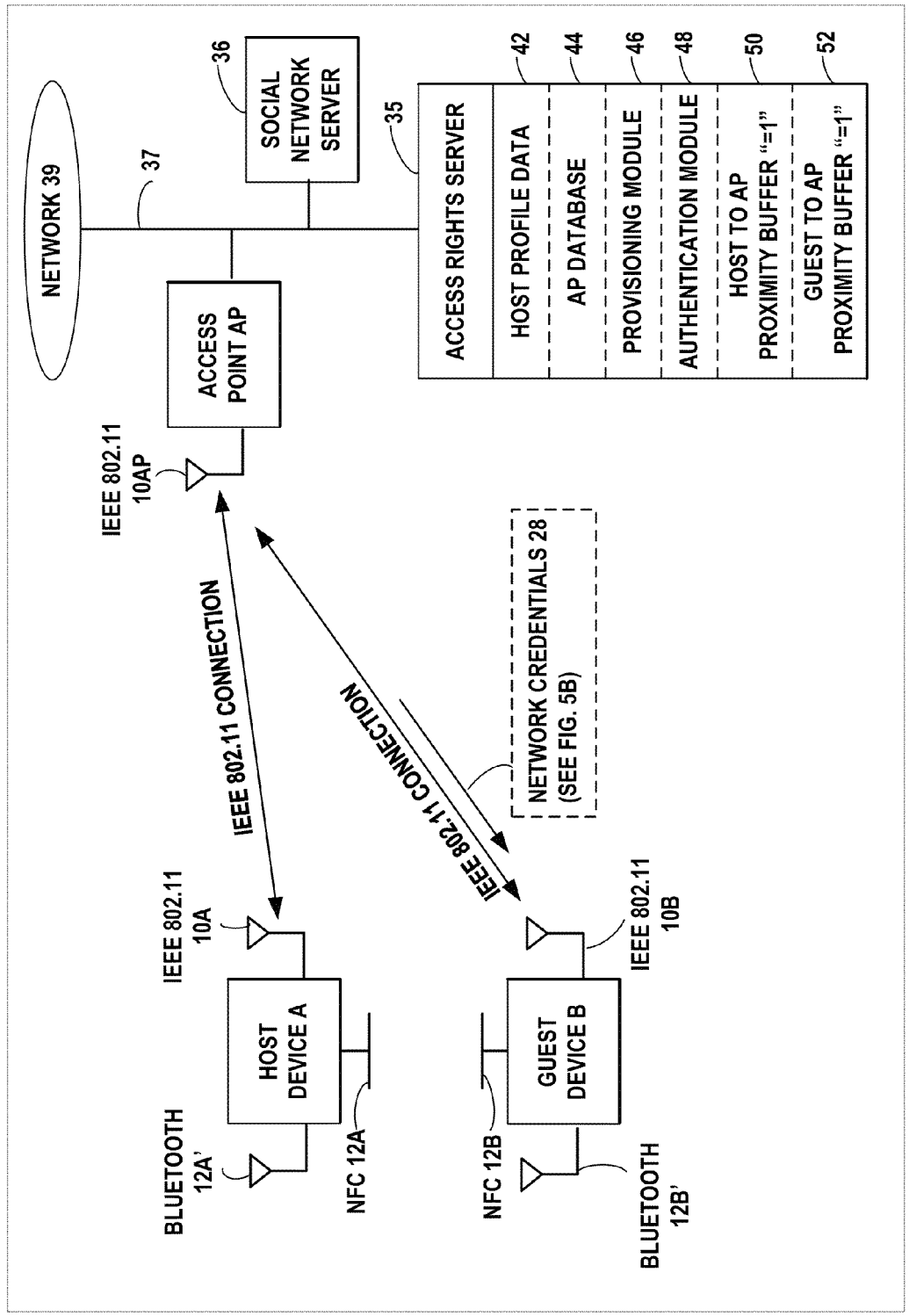
FIG. 1H illustrates the example network diagram of FIG. 1G, wherein the access point AP recognizes the authentication information, has detected the presence of both the host device A and the guest device B within the coverage area, and has conveyed this information to the access rights server 35. The access rights server 35, via the access point AP, grants network access to guest device B. After additional signaling, the access point AP sends credentials to guest device B, in accordance with example embodiments of the invention.

FIG. 1H illustrates the example network diagram of FIG. 1G, wherein the access point AP recognizes the authentication information, has detected the presence of both the host device A and the guest device B within the coverage area, and has conveyed this information to the access rights server 35. The access rights server 35, via the access point AP, grants network access to guest device B. After additional signaling, the access point AP sends credentials to guest device B, in accordance with example embodiments of the invention.

The access rights server 35, via the access point AP, grants network access to guest device B. Guest device B connects to the access point AP and initiates the IEEE 802.1X port-based Network Access Control procedure for port-based authentication. Guest device B runs the Wi-Fi Simple Configuration EAP method by sending an EAPoL-Start message to the access point AP. Guest device B and the access point AP exchange Registration Protocol messages M1-M8 to provision guest device B with network credentials for the network. Guest device B then disassociates and reconnects to the access point AP, using its new WLAN authentication credentials. FIG. 5B illustrates an example MAC management frame 130AP sent by the access point AP to the guest device B with the messages M2, M4, M6, and M8 in WSC information elements 502, used to assemble the credentials 28 in guest device B. Proximity continues between the host device A and the access point AP with host to AP proximity buffer 50 set "=1". Proximity continues between guest device B and access point AP with guest to AP proximity buffer 52 set "=1".

Figure 1I:
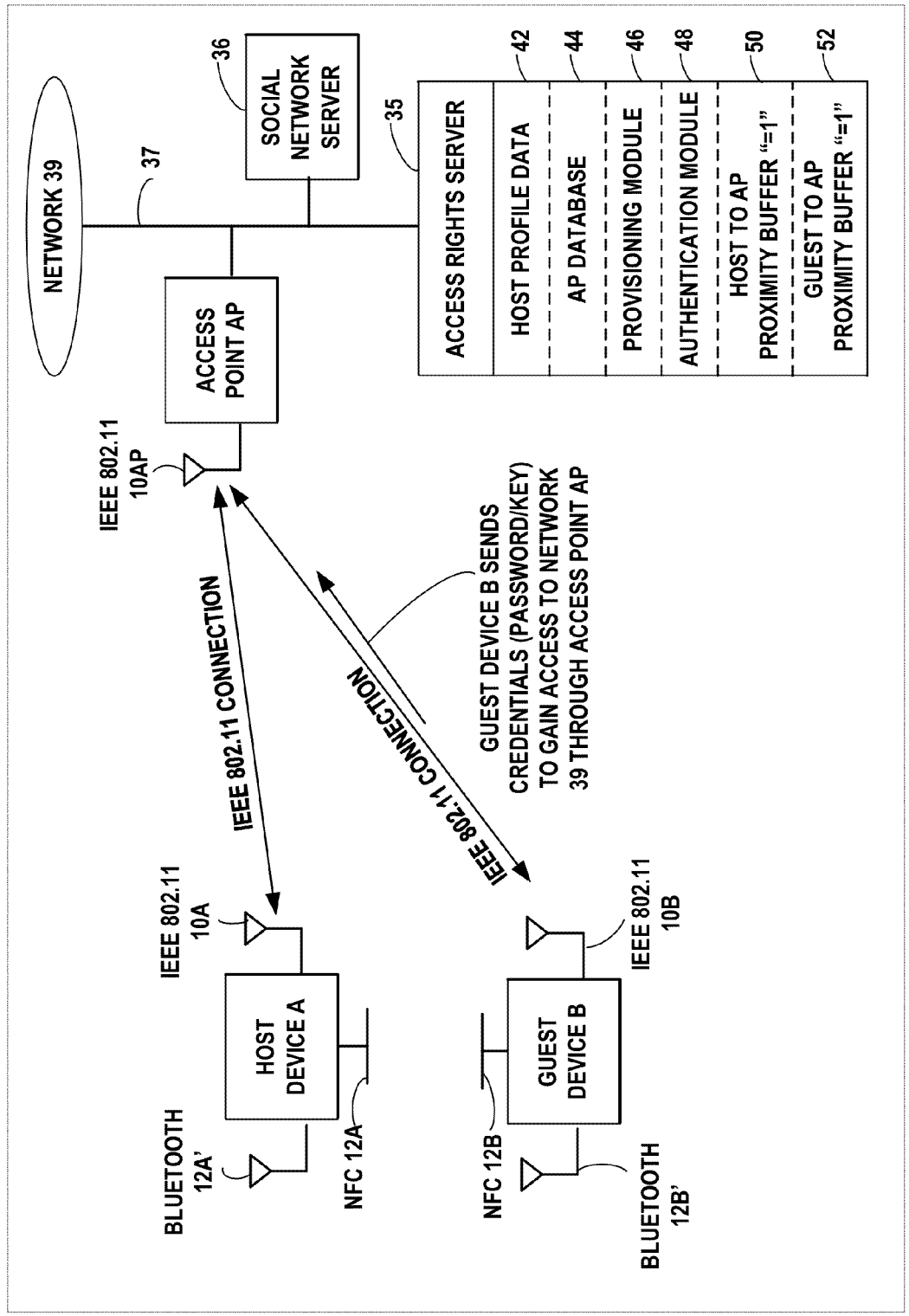
FIG. 1I illustrates the example network diagram of FIG. 1H, wherein guest device B is now connected to the network with its new configuration and may communicate with the network, through the access point AP. The access point AP monitors for the continued presence of the host device A and the guest device B within the WLAN and reports that status to the access rights server 35, in accordance with example embodiments of the invention.

FIG. 1I illustrates the example network diagram of FIG. 1H, wherein guest device B is now connected to the network 39 with its new configuration and may communicate with the network, through the access point AP. The figure shows that the host device A continues to be within the WLAN coverage area, over its IEEE 802.11 in-band short-range carrier communication connection with the access point AP. The access point AP monitors for the continued presence of the host device A and the guest device B within the WLAN and reports that status to the access rights server 35, in accordance with example embodiments of the invention.

Guest device B has automatically joined the network 39 that now includes the access point AP and both client devices, host device A and guest device B, without requiring the user to type in a PIN number. Proximity continues between host device A and access point AP with host to AP proximity buffer 50 set "=1". Proximity continues between guest device B and access point AP with guest to AP proximity buffer 52 set "=1".

Figure 1J:
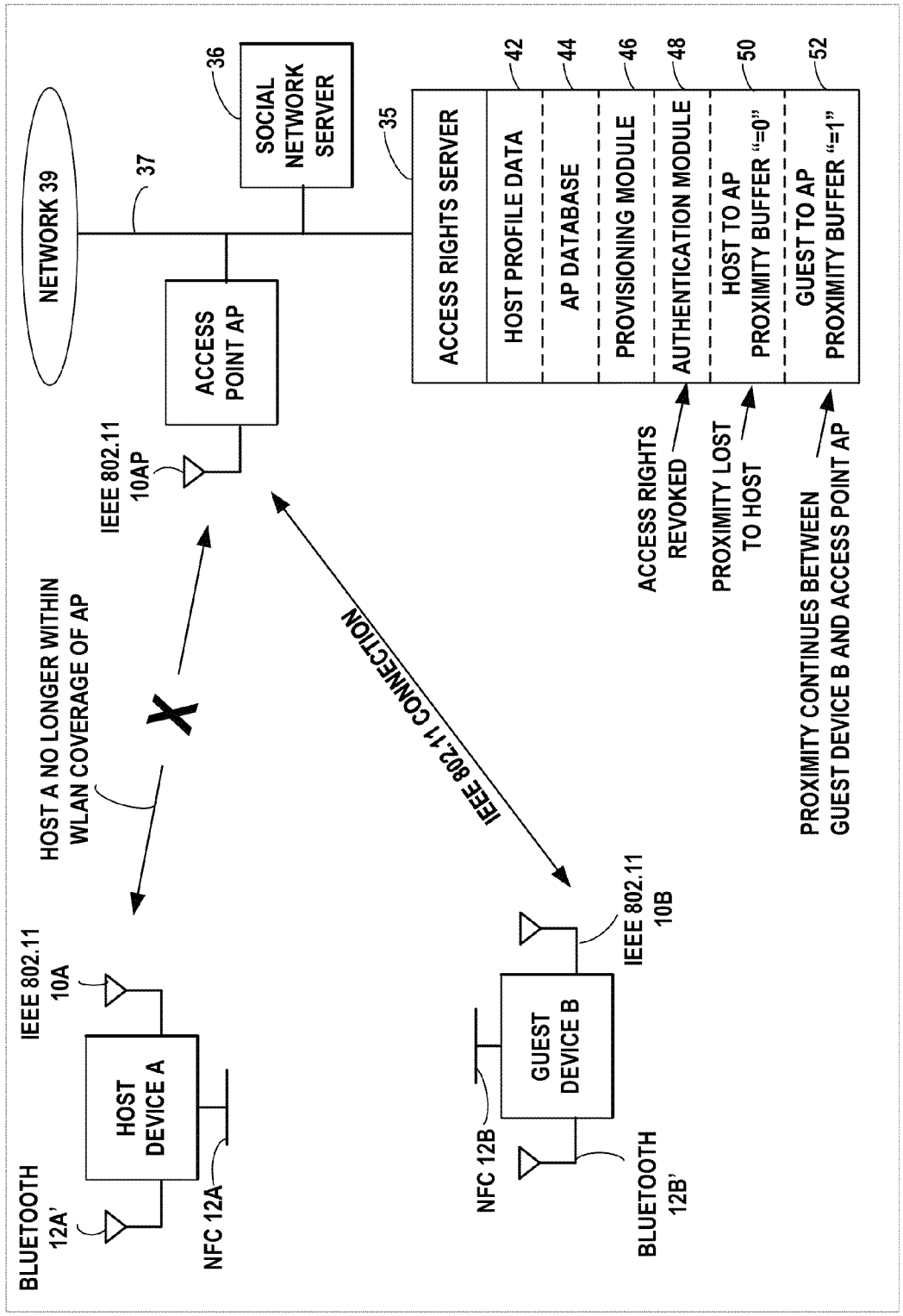
FIG. 1J illustrates the example network diagram of FIG. 1I, where the host device A has moved away from the coverage area of the access point AP and this information is sent to the access rights server, which revokes the access rights of guest device B, in accordance with example embodiments of the invention.

FIG. 1J illustrates the example network diagram of FIG. 1I, where the host device A has moved away from the coverage area of the access point AP while the guest device B remains connected to the access point AP. This information is sent to the access rights server, which revokes the access rights of guest device B, in accordance with example embodiments of the invention. The host to AP proximity buffer 50 is reset to "=0".

Figure 1K:
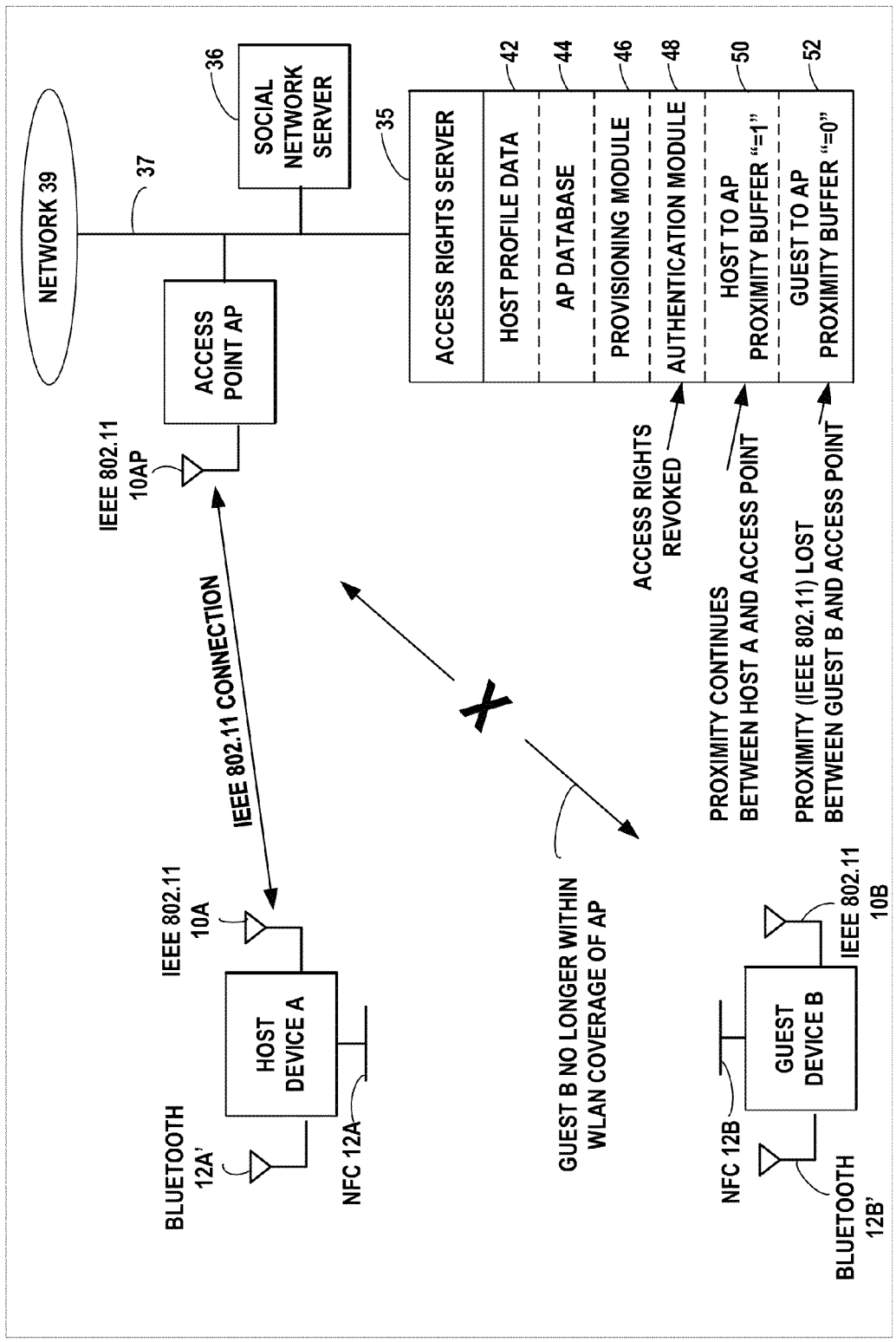
FIG. 1K illustrates the example network diagram of FIG. 1I, where the guest device B has moved away from the coverage area of the access point AP and this information is sent on to the access rights server, which revokes the access rights of guest device B, in accordance with example embodiments of the invention.

FIG. 1K illustrates the example network diagram of FIG. 1I, where the guest device B has moved away from the coverage area of the access point AP while the host device A remains connected to the access point AP. This information is sent on to the access rights server, which revokes the access rights of guest device B, in accordance with example embodiments of the invention. The guest to AP proximity buffer 52 is reset to "=0".

In an example alternate embodiment, the guest device B may generate its own random number as an authentication information 25 and send it to host device A via the NFC touch procedure. Host device A would then transmit the random number to the access point AP via the IEEE 802.11 in-band short-range carrier communication connection, so that the authentication information 25 is recognizable by the access point AP.

In alternate example embodiments of the invention, RFID transponders may be used in devices A and B, which may be the passive type or the active type, instead of the NFC transponders. A passive RFID transponder requires no internal power source to communicate with an RFID reader, and is only active when it is near an RFID reader that energizes the transponder with a continuous radio frequency signal at a resonant frequency of the antenna. The small electrical current induced in the antenna by the continuous radio frequency signal provides enough power for an integrated circuit in the transponder to power up and transmit a modulated response, typically by backscattering the continuous carrier wave from the RFID reader. A passive RFID transponder may include writable electrically erasable, programmable, read-only memory (EEPROM) for storing data received from the RFID reader, which modulates the continuous carrier wave sent by the RFID reader. Reading distances for passive RFID transponders typically range from a few centimeters to a few meters, depending on the radio frequency and antenna design. By contrast, active RFID transponders require a power source to receive and transmit information with an RFID reader. The RFID transponder may be affixed to or integrated with the wireless host device A and guest device B and the user brings the RFID transponder on the host device A close to an RFID reader circuit in guest device B to allow near field communication between the devices. In example embodiments, both devices A and B may have RFID reader circuits to read RFID signals from the other device.

In an example embodiment of the invention, the Host Device A and Guest Device B should be near each other and within range of the WLAN Access Point that the owner of Host Device A is responsible for. The Host Device A and Guest Device B are near each other if they are within e.g. Bluetooth, WLAN or NFC range or their proximity can be determined from position location devices, such as GPS devices. When the Host Device A determines (based on e.g. scanning) that the Guest Device B is nearby and that the WLAN Access Point is also nearby, then it instructs the Server to provision the WLAN Access Point to enable by the Guest Device B. The Server provisions the WLAN Access Point to the Guest Device B with all of the needed information to make a connection between the WLAN Access Point device and the Guest Device B. The Host Device A periodically checks that Guest Device B is still nearby. When the Host Device A and Guest Device B are no longer near each other, the Server revokes access rights from the Guest Device B. The Guest Device B has access rights to the WLAN Access Point only when the Host Device A and Guest Device B are near each other and both are within range of the WLAN Access Point.

In an example embodiment of the invention, the user of the Host Device A may authorize other devices known to it, such as a friend registered in the social network server 36, to act as a temporal Host Device on behalf of the Guest Device B. For example, the user of the host device may authorize his wife's device to act as a Host Device to an otherwise authorized Guest Devices, enabling the guest device to connect to the user's home access point, when the user's wife is present, but the user is not present. In an example embodiment of the invention, the host device A may grant access rights to a guest device B based on presence of a device group to which the host device A is a member, wherein the access is granted to guest device B whenever any of the devices that are members of the device group, are present within the network coverage.

Figure 4A:
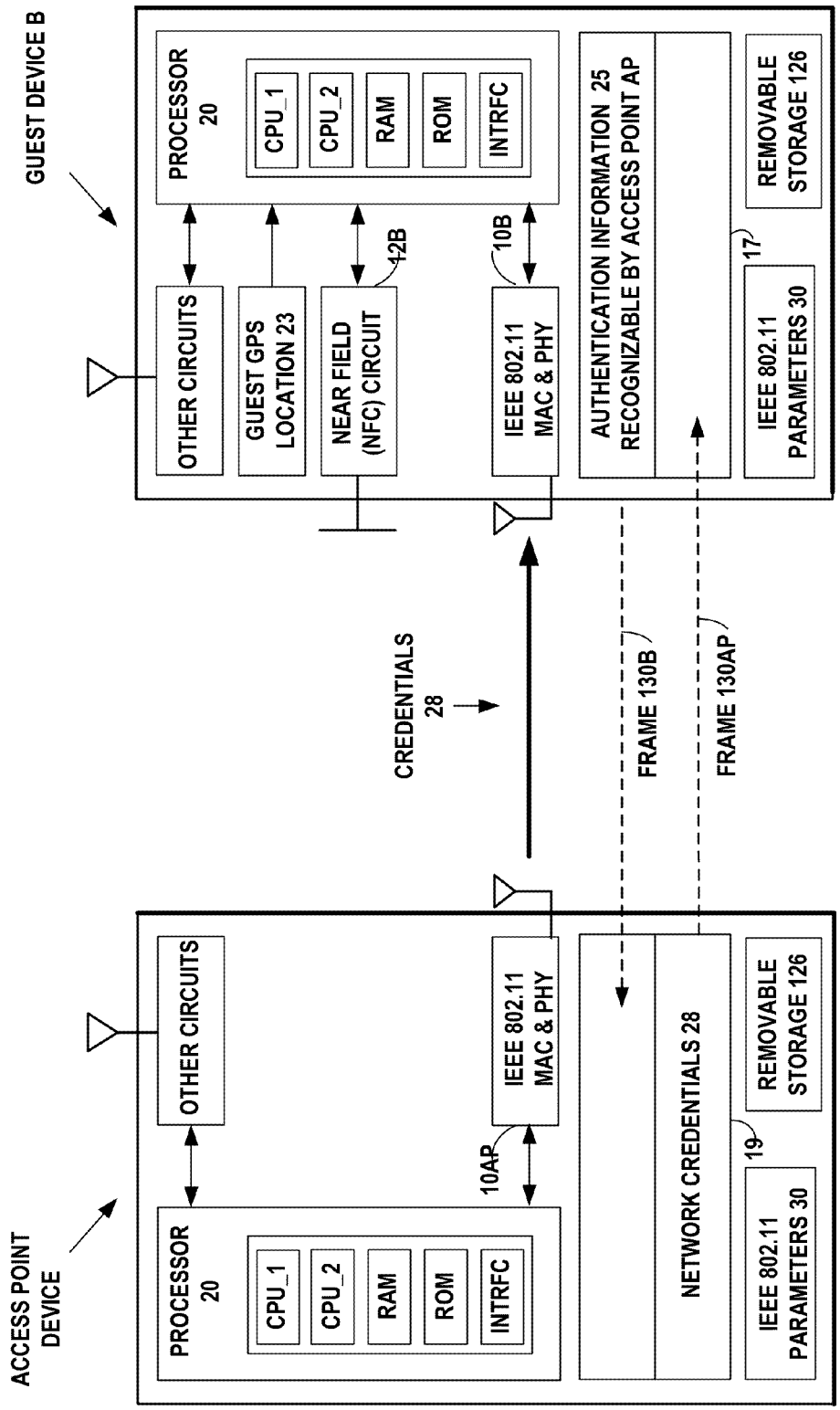
FIG. 4A is an example functional block diagram of guest device B and the access point AP of FIG. 1A, where guest device B sends the authentication information to the access point AP, which was obtained by the guest device B when it engaged in an NFC touch while proximate to host device A, and in response the access point AP sends network credentials to guest device B, according to an embodiment of the present invention.

FIG. 2A is a wireless network diagram of an example embodiment of wireless host device A and wireless guest device B. The host device A and guest device B are each equipped with an out-of-band NFC transceiver 12A and 12B, respectively, using the Near Field Communication (NFC) protocol. The host device A and guest device B of FIG. 2A and access point AP of FIG. 4A, are each equipped with one or more in-band short-range carrier transceivers, for example the in-band short range transceiver 10A, 10B, and 10C, respectively, that use the IEEE 802.11 protocol. The NFC protocol is out-of-band from the point of view of the in-band IEEE 802.11 protocol.

Figure 8:
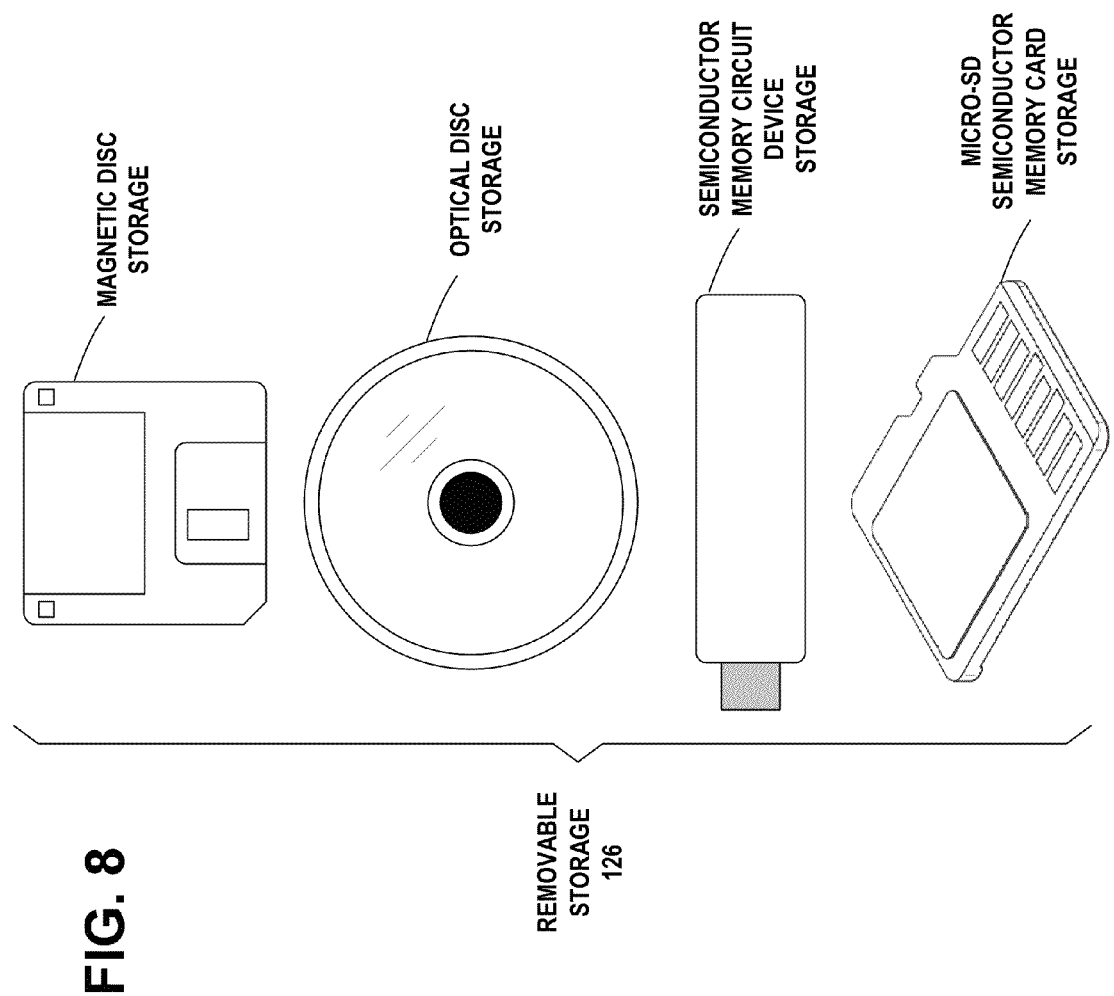
FIG. 8 illustrates an example embodiment of the invention, wherein examples of removable storage media are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

In an example embodiment, host device A and guest device B of FIG. 2A and access point AP of FIG. 4A, may each be a host device having an overall function as a PDA, cell phone, laptop or palmtop computer, or the like. The host device A and guest device B of FIG. 2A and access point AP of FIG. 4, each include a processor 20 that includes a dual core or multi-core central processing unit (CPU_1 and CPU_2), a random access memory (RAM), a read only memory (ROM), and interface circuits to interface with host circuits, such as a cell phone radio, a battery and other power sources, key pad, touch screen, display, microphone, speakers, ear pieces, camera or other imaging devices, etc. in the host device A and guest device B. The RAM and ROM may be removable memory devices 126 such as smart cards, SIMs, WIMs, semiconductor memories such as RAM, ROM, PROMS, flash memory devices, etc., as shown in FIG. 8. The IEEE 802.11 MAC and PHY 10A, 10B, and 10C, provide the medium access control and radio for IEEE 802.11 WLAN communications. The host device A may include a user interface, such as a key pad 41, shown in FIG. 2A The host device A and guest device B have similar components. In an example embodiment, host device A and guest device B of FIG. 2A may include a GPS location detector 21 and 23, respectively.

The IEEE 802.11 MAC and PHY 10A of host device A of FIG. 2A may generate authentication information 25 and buffer it in an input/output buffer 15. The authentication information 25 may include, for example, a random number or a value based on public key encryption. The MAC address of the access point AP may also be buffered in the input/output buffer 15 of host device A.

Each NFC circuit 12A in host device A and NFC circuit 12B in guest device B, which use in the Wi-Fi Protected Setup (WPS) standard, communicates bi-directionally with the other NFC circuit 12A or 12B via magnetic field induction, where two loop antennas are located within each other's near field, effectively energizing a wireless contact by forming an air-core transformer. An example NFC radio of NFC circuit 12A or 12B operates within the unlicensed radio frequency ISM band of 13.56 MHz, with a bandwidth of approximately 2 MHz over a typical distance of a few centimeters. The NFC circuit 12A or 12B may be affixed to or an integral part of host device A and guest device B and the user brings the NFC radio on the device close to the other NFC circuit 12A or 12 B of the other device to allow near field, bidirectional communication between the devices.

The IEEE 802.11 parameters 30 of host device A and guest device B of FIG. 2A and access point AP of FIG. 4A, may include the wireless LAN parameters and credentials information for the IEEE 802.11 Service Set Identifier (SSID), authentication and encryption type deployed by the wireless network, the secret network key that a wireless station needs to authenticate with the network, and the MAC address of the device receiving the configuration (if unknown, this address is set to all-zeros).

The Wi-Fi Protected Setup programmed instructions may be stored in the memory host device A, guest device B, and access point AP, based on the *Wi-Fi Simple Configuration Specification*, Version 2.0, to enable setting up a device-to-device WLAN network with a second wireless device, using near-field communication signals in the out-of-band device-to-device connection setup. Also included in the memory host device A, guest device B, and access point AP, is the Wi-Fi Direct Peer-to-Peer protocol program, based on the *Wi-Fi Alliance Peer-to-Peer Specification*, for P2P networks. The programmed instructions may be implemented as software, firmware, hardware or any combination thereof.

Also included in host device A and guest device B are the Wi-Fi Protected Setup (WPS) 2.0 specification programmed instructions for NFC, including the Connection Handover specified for Infrastructure WLAN setup, Password Token (tag) for Infrastructure WLAN setup, and Configuration Token (tag) for Infrastructure WLAN setup. Also included in the memory of host device A and guest device B are programmed instructions for the NFC Connection Handover protocol, based on the *NFC Connection Handover Technical Specification*. The programmed instructions may be implemented as software, firmware, hardware or any combination thereof.

In example embodiments of the invention, access point AP may also be equipped with an out-of-band NFC transceiver and an implementation supporting the Near Field Communication (NFC) protocol.

The IEEE MAC 10A, 10B, and 10C, IEEE 802.11 parameters 30, Wi-Fi Protected Setup Program, Wi-Fi Direct Peer-to-Peer protocol program, and NFC Connection Handover program may be embodied as program logic stored in the RAM and/or ROM in the form of sequences of programmed instructions which, when executed in the CPU, carry out the functions of the disclosed embodiments. The program logic can be delivered to the writeable RAM, PROMS, flash memory devices, etc. of the host device A, guest device B, and access point AP from a computer program product or article of manufacture in the form of computer-usable media such as resident memory devices, smart cards or other removable memory devices 126. Alternately, they can be embodied as integrated circuit logic in the form of programmed logic arrays or custom designed application specific integrated circuits (ASIC). The one or more PHY radios in the host device A, guest device B, and access point AP may be separate transceiver circuits or alternately, the one or more radios may be a single RF module capable of handling one or multiple channels in a high speed, time and frequency multiplexed manner in response to the processor 20. Host device A, guest device B, and access point AP may have the same or similar components.

When the user brings the two NFC equipped devices A and B into close proximity, as shown in FIGS. 1A and 1B, they may establish an NFC communication link based on the NFC Forum Logical Link Control Protocol (LLCP) specification. In this example, it is be the user's intention to have guest device B activate a different wireless communication protocol, such as the IEEE 802.11 WLAN protocol, in order to enable guest device B to obtain network access through the access point AP and join the existing infrastructure network 39, of which host device A may be a member. Guest device B may use the NFC Forum Connection Handover protocol to request from host device A, information to enable guest device B to obtain network access through the access point AP.

Host device A is shown in FIG. 1C initiating an out-of-band NFC connection handover with guest device B by the NFC transceiver 12A transmitting wireless communication signals for providing the NFC communication connection. When the NFC selector host device A has established LLCP communication with the NFC requestor guest device B, the requestor guest device B sends in FIG. 1D, a handover request message 60, shown in FIG. 3A, to host device A, with its request for information to enable guest device B to obtain network access through the access point AP.

The NFC selector host device A then responds by sending to guest device B in FIG. 1E, a handover select message 61, shown in FIG. 3B, including the authentication information 25 and connection information, such as the MAC address 26 of the access point AP, to carry out a connection setup between guest device B and the access point AP. The handover select message 61 includes the authentication information 25 and the MAC address 26 of the access point AP that are output from the input/output buffer 15 of host device A. Guest device B of FIG. 2A may receive authentication information 25 and MAC address 26 of the access point AP, which may be buffered in the input/output buffer 17 of guest device B.

Figure 2B:
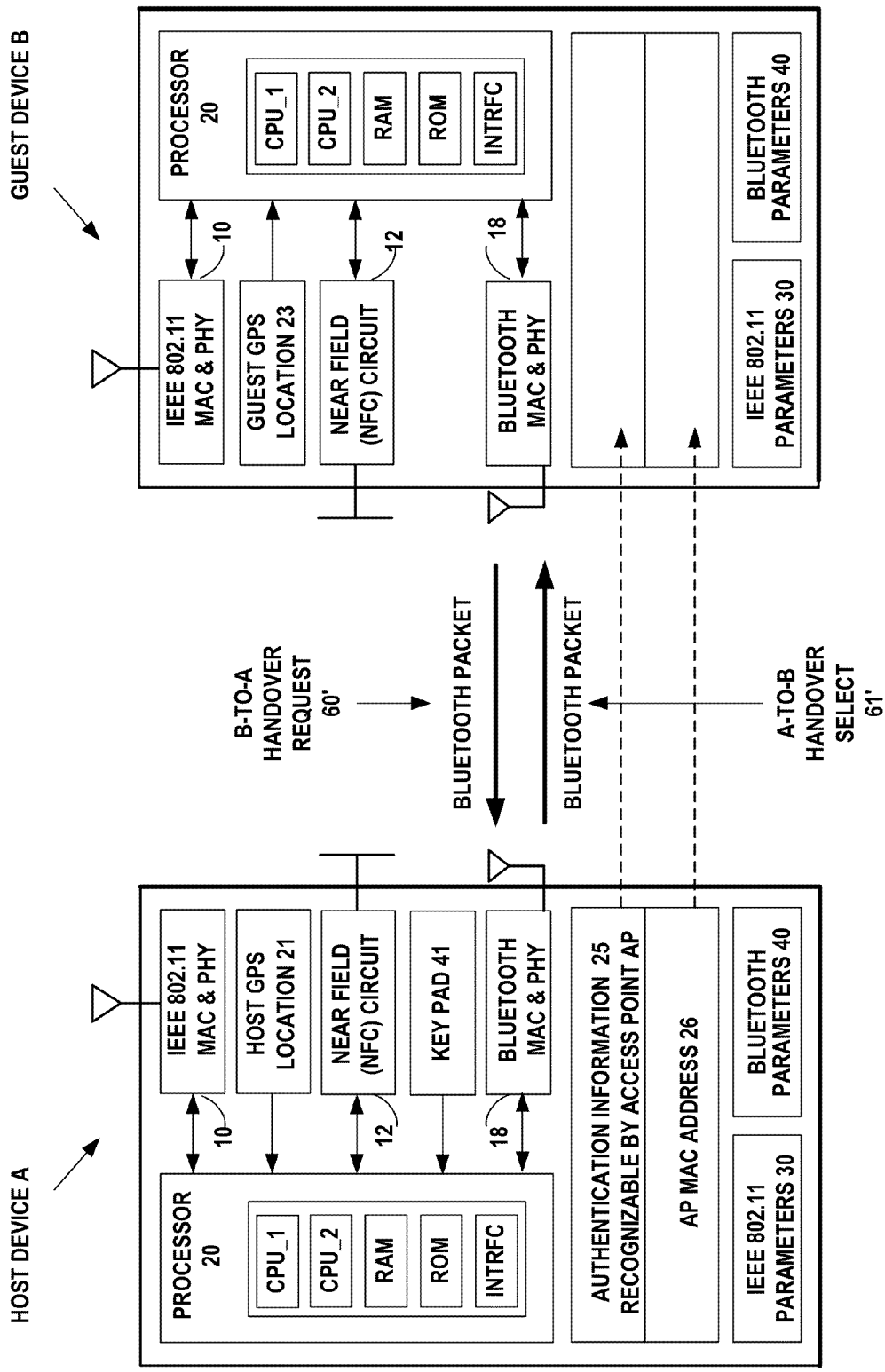
FIG. 2B is an example functional block diagram of host device A and guest device B of FIG. 1A, showing each device equipped an out-of-band Bluetooth transceiver and an in-band short-range carrier transceiver, in accordance with example embodiments of the invention.

FIG. 2B is a wireless network diagram of an example alternate embodiment of wireless host device A and wireless guest device B. The host device A and guest device B are each equipped with an out-of-band Bluetooth transceivers 18, respectively, using the Bluetooth protocol. The host device A and guest device B of FIG. 2A and access point AP of FIG. 4A, are each equipped with one or more in-band short-range carrier transceivers, for example the in-band short range transceiver 10A, 10B, and 10C, respectively, that use the IEEE 802.11 protocol. The Bluetooth protocol is out-of-band from the point of view of the in-band IEEE 802.11 protocol.

When the user brings the two Bluetooth equipped devices A and B into close proximity, they may establish a Bluetooth communication link based on the Bluetooth Protocol specification. In this example, it is be the user's intention to have guest device B activate a different wireless communication protocol, such as the IEEE 802.11 WLAN protocol, in order to enable guest device B to obtain network access through the access point AP and join the existing infrastructure network 39, of which host device A may be a member. Guest device B may use the Bluetooth Handover protocol to request from host device A, information to enable guest device B to obtain network access through the access point AP.

Host device A initiates an out-of-band Bluetooth connection handover with guest device B by the Bluetooth transceiver 18 transmitting wireless communication signals for providing the Bluetooth communication connection. When the host device A has established communication with the guest device B, the requestor guest device B sends a handover request message 60' to host device A, with its request for information to enable guest device B to obtain network access through the access point AP.

The host device A then responds by sending to guest device B a handover message 61' including the authentication information 25 and connection information, such as the MAC address 26 of the access point AP, to carry out a connection setup between guest device B and the access point AP. The handover message 61' includes the authentication information 25 and the MAC address 26 of the access point AP that are output from the input/output buffer 15 of host device A. Guest device B of FIG. 2B may receive authentication information 25 and MAC address 26 of the access point AP, which may be buffered in the input/output buffer 17 of guest device B.

FIG. 3A is one example embodiment of an NFC handover request message 60 format from the guest device B to the host device A with a request for information to enable guest device B to obtain network access through the access point AP, in the NDEF record, sent by the requestor over the NFC link, according to an embodiment of the present invention. A new NDEF record is added to carry the request. NDEF messages enable a handover requester B to negotiate with the handover selector A over the NFC link.

The handover request message 60 is composed of a handover request record that identifies the version of the handover specification being used, and the alternative carrier record that identifies the target carrier type to which that handover is directed, such as a handover from the NFC link to an IEEE 802.11 WLAN link. The handover request record may have a plurality of alternative carrier records, one for each of a plurality of possible target carriers. The handover request record is followed by several NDEF records. Each alternative carrier record in the handover request record includes pointers to related NDEF records. The first NDEF record pointed to by an alternative carrier record contains carrier configuration characterizing the intended target carrier, such as IEEE 802.11. The following NDEF record pointed to by the alternative carrier record contains auxiliary data associated with the intended target carrier or other information related to the handover to the target carrier.

FIG. 3B is one example embodiment of an NFC handover select message 61 sent from the selector host device A to the requester guest device B. NFC handover select messages 61 may be similarly constructed as are the handover request messages 60. A new NDEF record may added to carry the additional information needed to either acknowledge the request, provide connectivity settings for the guest device B and the authentication information 25, or to respond with an alternate proposal for the connection, sent by the selector A over the NFC link, according to an embodiment of the present invention.

The authentication information 25 is recognizable by the access point AP, the authentication information having been obtained by the guest device B when it engaged in the NFC touch while proximate to host device A. The authentication information 25 may include, for example, a random number or a value based on public key encryption that was previously generated by host device A.

The following Table 2 shows an example NDEF record 24 that includes the authentication information 25 carried in the NDEF record of the NFC handover select message 61 of FIG. 3B.

TABLE 2

NDEF Record 24

| Attribute | R/O | Notes, Allowed Values |
|---|---|---|
| SSID | R | SSID of network. |
| Network Type | R | <information whether it is Infra or Wi-Fi Direct network> |
| Client MAC Address | R | MAC address of the Client <may be needed for security reasons> |
| access point AP MAC Address | R | MAC address of the access point AP |
| Channel | O | <This would shorten delay because right channel is then not needed to search> |
| <Supported WPS methods by access point AP> | O | <This is useful to optimize needed user interactions in second WPS procedure> |
| <other access point AP device identity information> | O | <user may be difficult identify right guest device Based on just MAC address. So some more user friendly information would be useful, like device type, manufacturer name, user friendly device name, device model... Note: This is problem especially in NFC method and Wi-Fi Direct.> |
| <Client Device state> | O | <some kind state information of touched Client device, in simplest this could be just define that device is 'Client'. Also more detailed information could be useful> |
| <other Client identity information> | O | <Device Name, UUID (in case of UPnP/DLNA), IP address or such identity of the touched Client device, see *)> |
| <basic Client capability information> | O | <for example supported Wi-Fi modes, capability to do another Wi-Fi connection, see **> |
| <other...> | O | Multiple attributes are permitted. |

The operation of touching the host device A to the guest device B is typically made because of a desire for them to communicate. Thus, the MAC address in the example record is useful information. Other identity information may also be useful to help reduce delays in connection setup.

If both devices that are touched together are client devices of the different networks, then the information in the example record may be used to decide which one of the devices may have an better route to access other device's network, for example in creating parallel connections.

It may be possible that both touching devices are already members of the same network. In this case the example record may be used to detect that situation and the devices may continue using their current connections for communication between each other.

Typically, NFC touch is 'blind', meaning that there is no prior in-band WLAN communication between the touched devices. However, at least in the infrastructure case 'touch during in-band' signaling is also supported, but the information for the NFC record may differ.

In the blind touch case, touching devices do not have any prior information of each other, and thus all relevant information is needed to carry over the NFC link to enable further WLAN in-band communication.

FIG. 4A is a wireless network diagram of an example embodiment of guest device B and access point AP. The guest device B and access point AP are each equipped with one or more in-band short-range carrier transceivers, for example the in-band short range transceiver 10B and 10C, respectively, that use the IEEE 802.11 protocol. After the NFC touch procedure, guest device B possesses the authentication information 25 recognizable by the access point AP, in its input/output buffer 17, the authentication information having been obtained by the guest device B when it engaged in the NFC touch while proximate to host device A.

Guest device B issues a request frame, for example a probe request frame 130B with a Wi-Fi Protected Setup (WSC) information element (IE) of FIG. 5A, sending it to the access point AP in a Wi-Fi Protected Setup procedure. The WSC information element (IE) of FIG. 5A may include the authentication information 25 recognizable by the access point AP. The WSC information element (IE) includes the authentication information 25 that was output from the input/output buffer 17 of guest device B. The access point AP of FIG. 4A may receive authentication information 25, which may be buffered in the input/output buffer 19 of the access point AP.

The access point AP will recognize the authentication information 25, the authentication information having been obtained by the guest device B when it engaged in the NFC touch while proximate to host device A. In response, access point AP will grant network access to guest device B. Guest device B connects to the access point AP and initiates the IEEE 802.1X port-based Network Access Control procedure for port-based authentication. Guest device B runs the Wi-Fi Simple Configuration EAP method by sending an EAPoL-Start message to the access point AP. Guest device B and the access point AP exchange Registration Protocol Messages M1-M8, such as frame 130AP of FIG. 5B, to provision guest device B with network credentials 28 for the network. An example of the credentials 28 is shown in Table 1, above.

Guest device B then disassociates and reconnects to the access point AP, using its new WLAN authentication credentials 28. Guest device B is now connected to the network with its new configuration and may communicate with host device A over the network, through the access point AP. Guest device B has automatically joined the network that now includes the access point AP and both client devices, host device A and guest device B, without requiring the user to type in a PIN number.

Figure 4B:
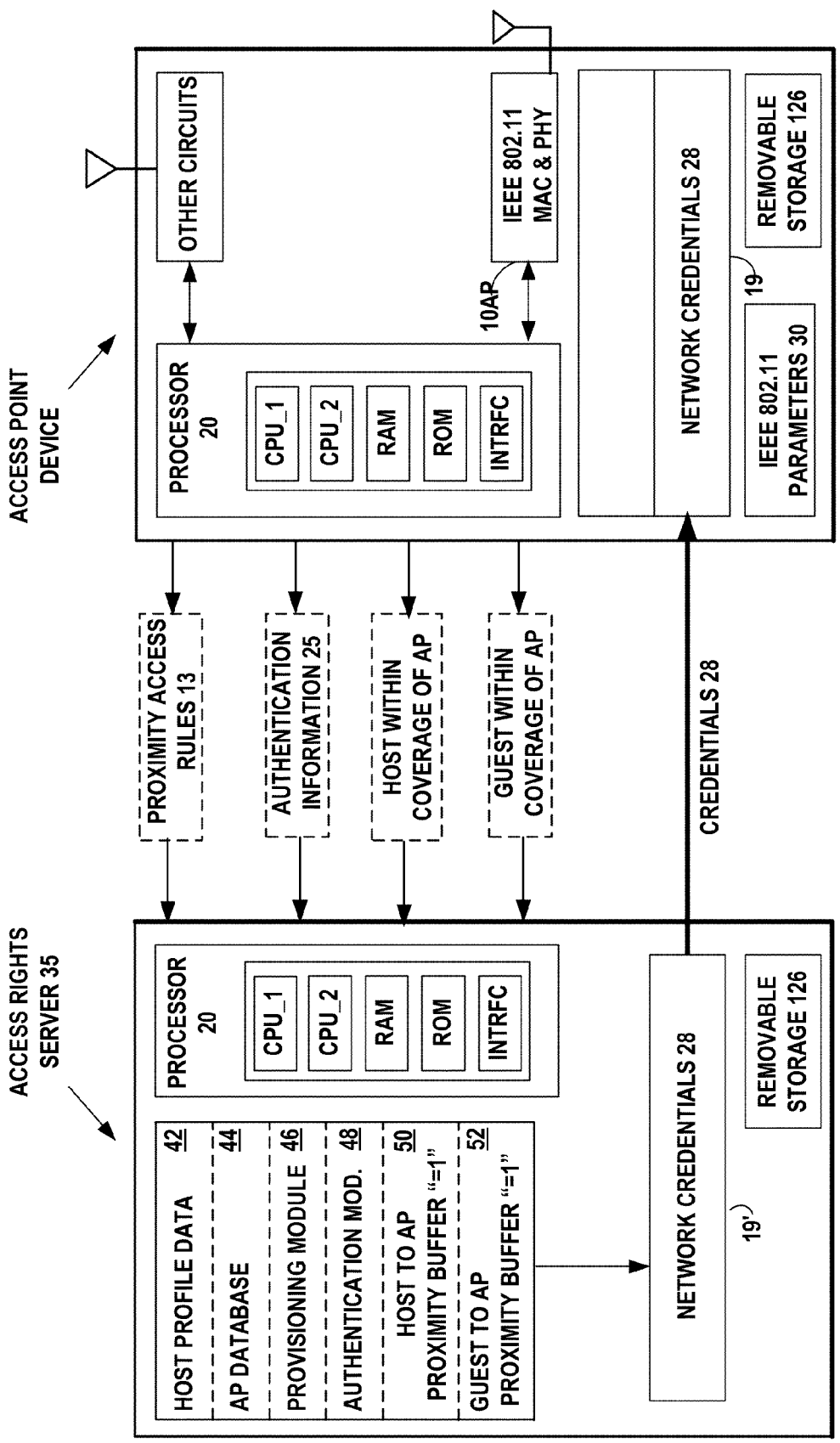
FIG. 4B is an example functional block diagram of access rights server of FIG. 1A, where the access point AP sends the proximity access rules, authentication information, and the status of whether the host device A and the guest device B are within the coverage area of the access point AP, to access rights server, and in response the access rights server, via the access point AP, sends network credentials to guest device B, according to an embodiment of the present invention.

FIG. 4B is an example functional block diagram of the access rights server 35 of FIG. 1A. The guest device B sends the authentication information 25 to the access rights server 35, via the access point AP, which was obtained by the guest device B when it engaged in an NFC touch while proximate to host device A. In response, the access rights server 35, via the access point AP, sends network credentials 28 to guest device B, only if both the host device A and the guest device B are within the coverage area of the access point AP, according to an embodiment of the present invention. FIG. 4B shows the processor 20 and RAM and ROM memory. In an example embodiment of the invention, the memory includes computer program code that is executed by the processor to cause the access rights server 35 at least to:

receive an access grant message from the host device A, via the access point AP, comprising one or more rules indicating that access rights for the guest device B are to be granted only when the host device A is present within the coverage of the wireless short-range communication network; and determine whether the host device A is present within the coverage of the wireless short-range communication network when receiving an access request from the guest device B.

In an example embodiment of the invention, the memory and the computer program code cause the access rights server 35 of FIG. 4B, at least to:

revoke the access rights to the network, when the first device or the second device is no longer within coverage of the wireless short-range communication network.

FIG. 5A illustrates one example embodiment of an IEEE 802.11 request frame, for example a probe request frame 130B sent by guest device B to the access point AP with the authentication information 25 in a WSC information element (IE) 500. The access point AP responds with its own discovery data in a probe response WSC information element. Then guest device B connects to the access point AP and initiates the IEEE 802.1X port-based Network Access Control procedure for port-based authentication. The guest device B and the access point AP exchange Registration Protocol Messages M1-M8, such as frame 130AP of FIG. 5B, to provision guest device B with network credentials 28 for the network in the buffer 17 of guest device B.

Probe request frame 130B includes an IEEE 802.11 management header that includes MAC frame type 521 indicating it is a management frame. Field 522 identifies the frame 130B as a probe request packet. The payload portion of the Probe request frame 130B includes the WSC information element (IE) 500 that includes an element ID field 523 and the record 24 with authentication information 25 in field 526.

FIG. 5B illustrates one example embodiment of a MAC management frame 130AP sent by the access point AP to the guest device B with the messages M2, M4, M6, and M8 in WSC information elements 502, used to assemble the credentials 28 in guest device B. The response frame 130AP includes an IEEE 802.11 management header that includes MAC frame type 531 indicating it is a management frame. Field 532 identifies the frame 130AP as a association response packet. The payload portion of the response frame 130AP includes the WSC information element (IE) 502 that includes an element ID field 533 and one of messages M2, M4, M6, M8 to assemble credentials 28 in field 536.

FIG. 6A is an example flow diagram 600 of example operational steps of an example embodiment of the method carried out between the two wireless devices of FIG. 2A, according to an embodiment of the present invention. The steps of the flow diagram represent computer code instructions stored in the RAM and/or ROM memory of the wireless host device A, which when executed by the central processing units (CPU), carry out the functions of the example embodiments of the invention. The steps may be carried out in another order than shown and individual steps may be combined or separated into component steps. Additional steps may be included in this sequence. The steps of the example method are as follows.

Step 602: receiving, by a first device, an input from a user of the first device to grant access rights to a wireless short-range communication network to a user of a second device when the first device is present within coverage of the wireless short-range communication network; and Step 604: transmitting, by the first device, an access grant message to a control node managing the wireless short-range communication network, wherein the access grant message comprises one or more rules indicating that access rights for a second device are to be granted only when the first device is present within coverage of the wireless short-range communication network.

Figure 6B:
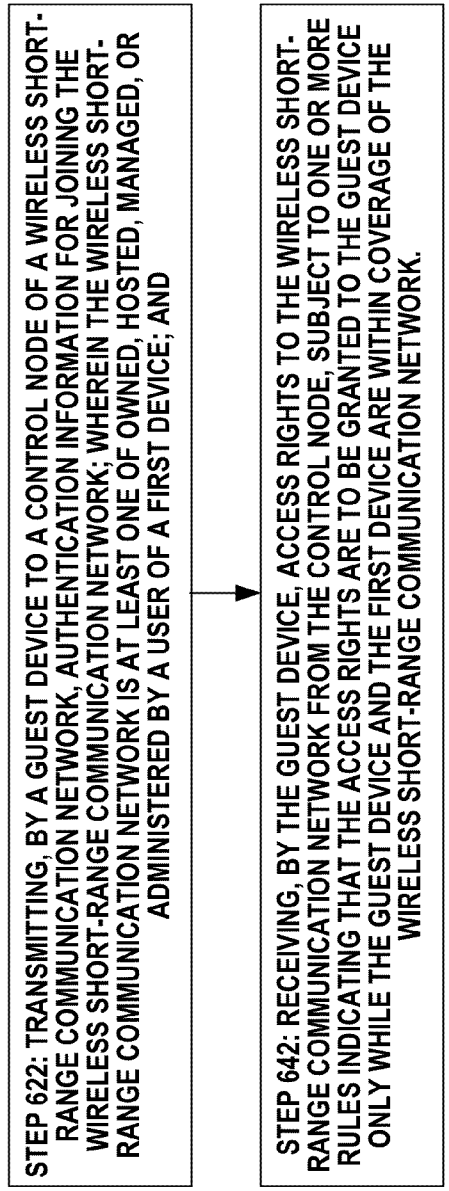
FIG. 6B is an example flow diagram of operational steps of an example embodiment of the method carried out by guest device B of FIG. 2A, according to an embodiment of the present invention.

FIG. 6B is an example flow diagram 620 of example operational steps of an example embodiment of the method carried out between the two wireless devices of FIG. 2A, according to an embodiment of the present invention. The steps of the flow diagram represent computer code instructions stored in the RAM and/or ROM memory of the wireless guest device B, which when executed by the central processing units (CPU), carry out the functions of the example embodiments of the invention. The steps may be carried out in another order than shown and individual steps may be combined or separated into component steps. Additional steps may be included in this sequence. The steps of the example method are as follows.

Step 622: transmitting, by a guest device to a control node of a wireless short-range communication network, authentication information for joining the wireless short-range communication network; wherein the wireless short-range communication network is at least one of owned, hosted, managed, or administered by a user of a first device; and Step 642: receiving, by the guest device, access rights to the wireless short-range communication network from the control node, subject to one or more rules indicating that the access rights are to be granted to the guest device only while the guest device and the first device are within coverage of the wireless short-range communication network.

Figure 6C:
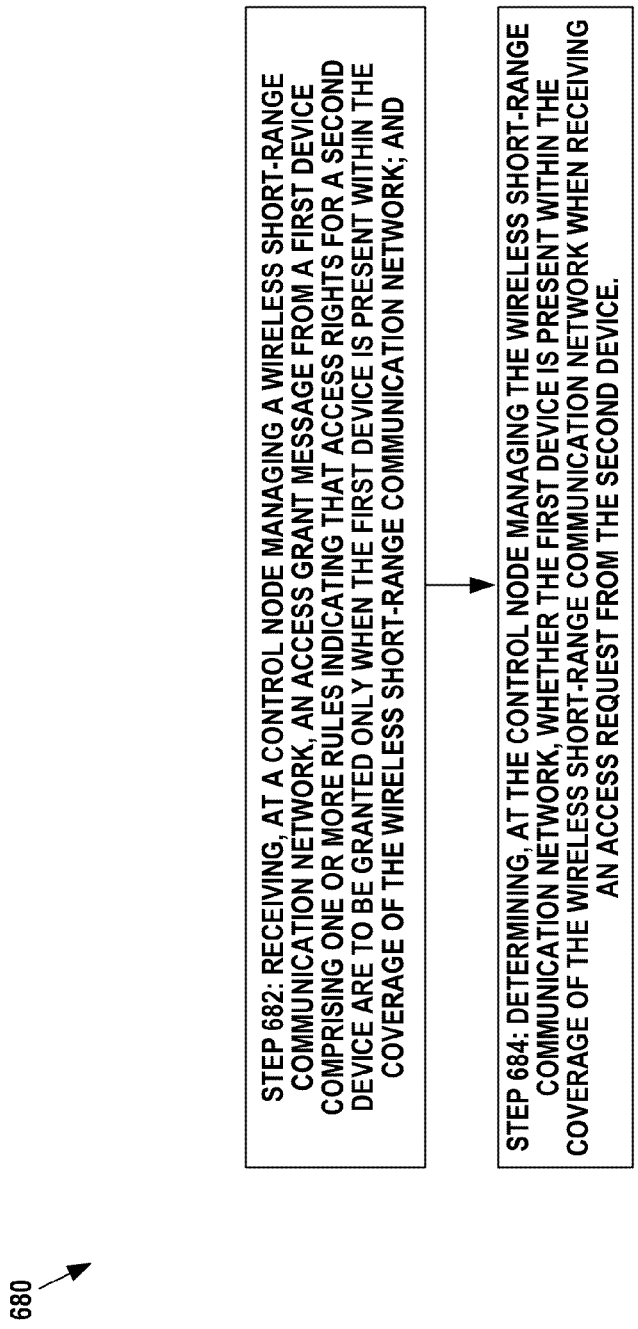
FIG. 6C is an example flow diagram of operational steps of an example embodiment of the method carried out by the access rights server of FIG. 4B, according to an embodiment of the present invention.

FIG. 6C is an example flow diagram 680 of example operational steps of an example embodiment of the method performed by the access rights server 35 FIG. 4B, according to an embodiment of the present invention. The steps of the flow diagram represent computer code instructions stored in the RAM and/or ROM memory of the access point AP, which when executed by the central processing units (CPU), carry out the functions of the example embodiments of the invention. The steps may be carried out in another order than shown and individual steps may be combined or separated into component steps. Additional steps may be included in this sequence. The steps of the example method are as follows.

Step 682: receiving, at a control node managing a wireless short-range communication network, an access grant message from a first device comprising one or more rules indicating that access rights for a second device are to be granted only when the first device is present within the coverage of the wireless short-range communication network; and Step 684: determining, at the control node managing the wireless short-range communication network, whether the first device is present within the coverage of the wireless short-range communication network when receiving an access request from the second device.

Figure 7:
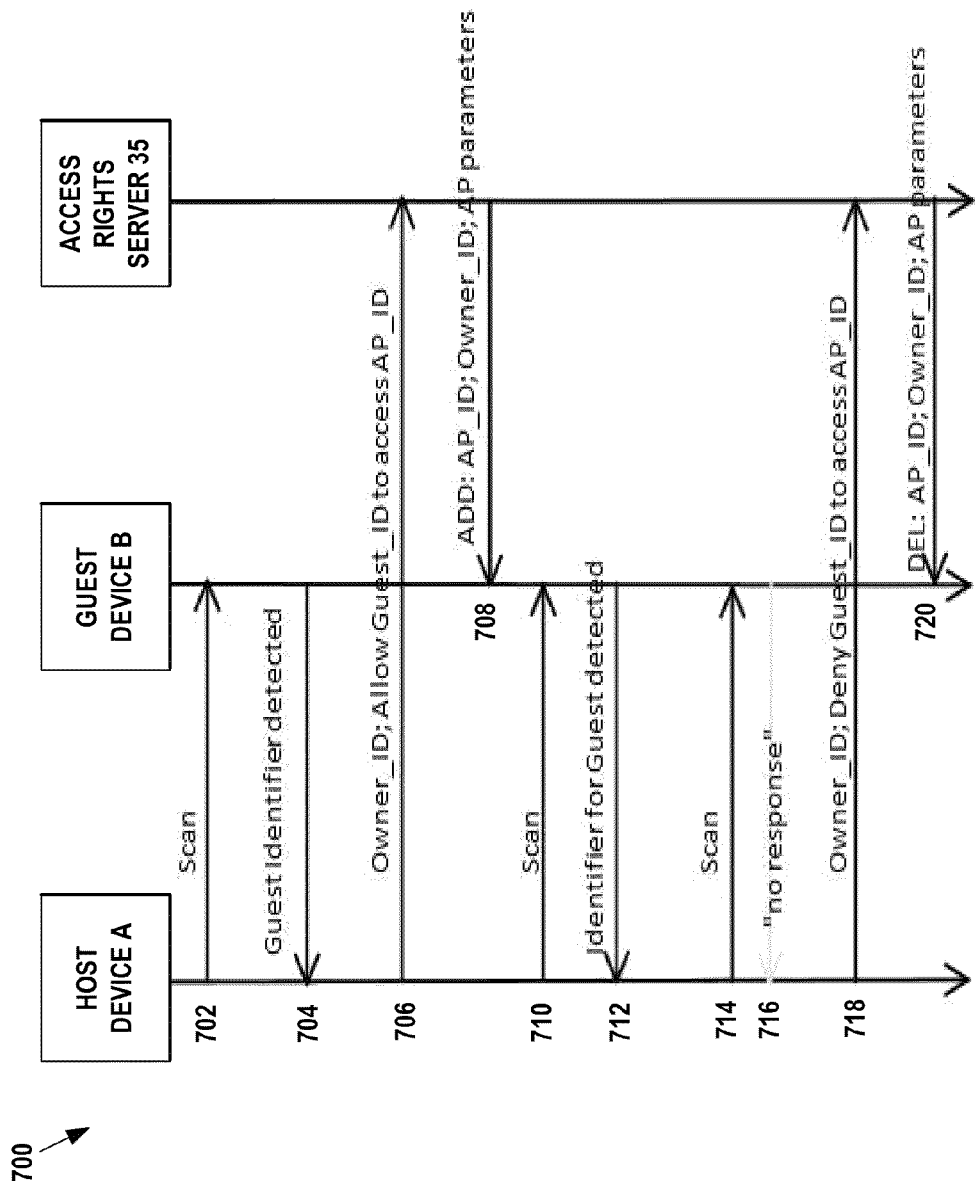
FIG. 7 is an example sequence diagram of an example sequence of actions performed by the host device, guest device, and access rights server for detecting the proximity of the guest device and resulting grant or revocation of access rights to the access point owned or operated by the host device, according to an embodiment of the present invention.

FIG. 7 is an example sequence diagram 700 of an example embodiment of the invention, wherein a sequence of actions is performed by the host device A, guest device B, and access rights server 35 for detecting the proximity of the guest device B and resulting grant or revocation to the guest device B of access rights to the access point AP owned or operated by the host device A, according to an embodiment of the present invention.

In an example embodiment of the invention, action 702 shows a scan by the host device A to determine whether the guest device B is proximate. The host device A may perform the scan using an out-of-band short-range communications protocol, such as Near Field Communication (NFC) or Bluetooth, or it may perform the scan using an in-band short-range communications protocol, such as IEEE 802.11. Action 704 shows the guest identifier is detected by the host device A.

In an example embodiment of the invention, action 706 shows the host or owner device A transmitting to the access rights server 35 via the access point AP, the host device's ID and an authorization to provide access rights to the guest device B for the access point AP. The handover from the NFC wireless communications medium or the Bluetooth wireless communications medium to the IEEE 802.11 WLAN, is accomplished in the action 706.

In an example embodiment of the invention, action 708 shows the access rights server 35 granting access rights to the guest device B and sending to it credentials for accessing the access point AP. Both the host device A and the guest device B are within coverage of the IEEE 802.11 WLAN.

In an example embodiment of the invention, action 710 shows a scan by the host device A to determine whether the guest device B continues to be proximate over the IEEE 802.11 wireless communications medium, for example. Action 712 shows the guest identifier is detected.

In an example embodiment of the invention, action 714 shows a scan by the host device A to determine whether the guest device B continues to be proximate over the IEEE 802.11 wireless communications medium, for example. Action 716 shows the guest identifier no longer detected. In an example embodiment of the invention, action 718 shows the host device A transmitting to the access rights server 35 via the access point AP, a command to deny access rights to the guest device B. In an example embodiment of the invention, action 720 shows the access rights server 35 revoking access rights to the guest device B.

FIG. 8 illustrates an example embodiment of the invention, wherein examples of removable storage media 126 are shown, based on magnetic, electronic and/or optical technologies, such as magnetic disks, optical disks, semiconductor memory circuit devices and micro-SD memory cards (SD refers to the Secure Digital standard), for storing data and/or computer program code as an example computer program product, in accordance with at least one embodiment of the present invention.

In an example embodiment, the an out-of-band short-range carrier transceiver in host device A and guest device B may be a suitable short-range communications protocol, such as Radio Frequency Identification (RFID), Near Field Communication (NFC), Infrared Data Association (IrDA), or Ultra Wide Band (UWB), for example.

An example of the Radio Frequency Identification (RFID) out-of-band short-range carrier is described, for example, ISO 11785 (air interface protocol), ISO 14443 (air interface protocol), and ISO 15693, incorporated herein by reference.

An example of the Near Field Communication (NFC) out-of-band short-range carrier is described, for example, in ISO/IEC 14443 and ISO/IEC 18092, incorporated herein by reference.

An example of the Infrared Data Association (IrDA) out-of-band short-range carrier is described, for example, in *IrDA Link Access Protocol*, v1.1 (1996), incorporated herein by reference.

An example of the Ultra Wide Band (UWB) out-of-band short-range carrier is described, for example, in *WiMedia Common Radio Platform Specification*, Version 1.5 (2010), incorporated herein by reference.

In example embodiments, the in-band short-range carrier transceiver in host device A, guest device B, and the access point AP may be a suitable communications protocol, such as a Vehicle Area (WVAN) communications protocol, Wireless Video Networks (WVAN-TV) communications protocol, Personal Area (WPAN) communications protocol, Local Area (WLAN) communications protocol, or Wide Area (WAN) communications protocol, using the standard procedures and primitives defined by the respective standards. Personal Area (WPAN) communications protocols include Bluetooth BR/EDR, Bluetooth Low Energy, Wireless USB (WUSB), Ultra Wide-band (UWB), ZigBee (IEEE 802.15.4, or IEEE 802.15.4a) for short range communication between devices. Local Area (WLAN) communications protocols include digital enhanced cordless telecommunications (DECT) and HIPERLAN. Wide Area (WAN) communications protocols include Global System for Mobile Communications (GSM), General Packet Radio service (GPRS), Enhanced data rates for GSM evolution (EDGE), Evolution-Data Optimized (EV-DO), and Wideband Code Division Multiple Access (W-CDMA).

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium or in any transmitting medium which transmits such a program.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention.

What is claimed is:

1. A method, comprising:
   receiving, by a first device, an input from a user of the first device to grant access rights to a wireless short-range communication network to a user of a second device, the access rights allowing the second device to access the wireless short-range communication network only when the first device is present within coverage of the wireless short-range communication network; and
   transmitting, by the first device, an access grant message to a control node managing the wireless short-range communication network, wherein the access grant message comprises one or more rules indicating that access rights for a second device are to be granted only when the first device is determined to be present within coverage of the wireless short-range communication network.

2. The method of claim 1, further comprising:
transmitting, by the first device, authentication information to the control node to enable the granting of the access rights to the second device only if the first device and the second device are present within the coverage of the wireless short-range communication network.

3. The method of claim 1, wherein users of the first and second devices are socially linked.

4. The method of claim 1, wherein a user of the first device at least one of owns, hosts, manages, or administers the wireless short-range communication network.

5. The method of claim 1, further comprising:
transmitting, by the first device, the authentication information and in-band communication connection parameters, to the second device via a wireless out-of-band short-range carrier, to enable the second device to setup an in-band communication connection with the control node, according to the in-band communication connection parameters.

6. The method of claim 1, wherein the first device is a member of a device group and access is granted to the second device whenever any devices of the group and the second device are present within the coverage of the wireless short-range communication network.

7. An apparatus, comprising:
at least one processor;
at least one memory including computer program code;
the at least one memory and the computer program code configured to, with the at least one processor, cause the apparatus at least to:
receive an input from a user of the apparatus to grant access rights to a wireless short-range communication network to a user of a second device, the access rights allowing the second device to access the wireless short-range communication network only when the apparatus is present within coverage of the wireless short-range communication network; and
transmit an access grant message to a control node managing the wireless short-range communication network, wherein the access grant message comprises one or more rules indicating that access rights for a second device are to be granted only when the apparatus is determined to be present within coverage of the wireless short-range communication network.

8. The apparatus of claim 7, further comprising:
the at least one memory and the computer program code configured to, with the at least one processor, cause the apparatus at least to:
transmit the authentication information and in-band communication connection parameters, to the second device via a wireless out-of-band short-range carrier, to enable the second device to setup an in-band communication connection with the control node, according to the in-band communication connection parameters.

9. The apparatus of claim 7, further comprising:
the at least one memory and the computer program code configured to, with the at least one processor, cause the apparatus at least to:
receive a request from the second device for the access rights; and
transmit authentication information to the control node, the authentication information, to enable the granting of the access rights to the second device only if the first device and the second device are present within the coverage of the wireless short-range communication network.

10. A computer program product comprising computer executable program code recorded on a computer readable non-transitory storage medium, the computer executable program code comprising:
code for receiving, by a first device, an input from a user of the first device to grant access rights to a wireless short-range communication network to a user of a second device, the access rights allowing the second device to access the wireless short-range communication network only when the first device is present within coverage of the wireless short-range communication network; and
code for transmitting, by the first device, an access grant message to a control node managing the wireless short-range communication network, wherein the access grant message comprises one or more rules indicating that access rights for a second device are to be granted only when the first device is determined to be present within coverage of the wireless short-range communication network.

11. A method, comprising:
receiving, at a control node managing a wireless short-range communication network, an access grant message from a first device comprising one or more rules indicating that access rights for a second device are to be granted only when the first device is determined to be present within the coverage of the wireless short-range communication network; and
determining, at the control node managing the wireless short-range communication network, whether the first device is present within the coverage of the wireless short-range communication network when receiving an access request from the second device.

12. The method of claim 11, further comprising:
granting, by the control node, the access rights to the second device to access the wireless short-range communication network only when it is determined that both the first device and the second device are within coverage of the wireless short-range communication network.

13. The method of claim 11, further comprising:
revoking, by the control node, the access rights to the network, when the first device or the second device is no longer within coverage of the wireless short-range communication network.

14. The method of claim 11, wherein the first device is a member of a device group and access is granted to the second device whenever any devices of the group and the second device are present within the coverage of the wireless short-range communication network.

15. The method of claim 11, further comprising:
revoking, by the control node, the access rights to access the wireless short-range communication network, when the first device or the second device is no longer within coverage of the wireless short-range communication network.

16. The method of any of the claims 11, wherein a user of the first device at least one of owns, hosts, manages, or administers the wireless short-range communication network.

17. An apparatus, comprising:
at least one processor;
at least one memory including computer program code;
the at least one memory and the computer program code configured to, with the at least one processor, cause the apparatus at least to:
receive, at the apparatus managing a wireless short-range communication network, an access grant message from a first device comprising one or more rules indicating that access rights for a second device are to be granted only when the first device is determined to be present within the coverage of the wireless short-range communication network; and determine whether the first device is present within the coverage of the wireless short-range communication network when receiving an access request from the second device.

18. The apparatus of claim 17, wherein the at least one memory and the computer program code are further configured to, with the at least one processor, cause the apparatus to grant the access rights to the second device to access the wireless short-range communication network only when it is determined that both the first device and the second device are within coverage of the wireless short-range communication network.

19. The apparatus of claim 17, further comprising:

the at least one memory and the computer program code configured to, with the at least one processor, cause the apparatus at least to:

revoke the access rights to access the wireless short-range communication network, when the first device or the second device is no longer within coverage of the wireless short-range communication network.

20. A computer program product comprising computer executable program code recorded on a computer readable non-transitory storage medium, the computer executable program code comprising:

code for receiving, at a control node managing a wireless short-range communication network, an access grant message from a first device comprising one or more rules indicating that access rights for a second device are to be granted only when the first device is determined to be present within the coverage of the wireless short-range communication network; and code for determining, at the control node managing the wireless short-range communication network, whether the first device is present within the coverage of the wireless short-range communication network when receiving an access request from the second device.

* * * * *